US006842552B1

(12) United States Patent
Steinberg et al.

(10) Patent No.: US 6,842,552 B1
(45) Date of Patent: Jan. 11, 2005

(54) OPTICAL WAVEGUIDE SWITCH

(75) Inventors: Dan A. Steinberg, Blacksburg, VA (US); John J. Fisher, Blacksburg, VA (US); David W. Sherrer, Blacksburg, VA (US); Mindaugas F. Dautartas, Blacksburg, VA (US); William T. Stacy, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 11 days.

(21) Appl. No.: 10/356,663

(22) Filed: Jan. 31, 2003

Related U.S. Application Data

(63) Continuation-in-part of application No. 09/835,106, filed on Apr. 13, 2001, which is a continuation-in-part of application No. 09/833,282, filed on Apr. 12, 2001, now Pat. No. 6,798,933.
(60) Provisional application No. 60/201,347, filed on May 2, 2000, provisional application No. 60/197,120, filed on Apr. 14, 2000, and provisional application No. 60/197,154, filed on Apr. 13, 2000.

(51) Int. Cl.[7] .............................. G02B 6/26; G02B 6/42
(52) U.S. Cl. .............................. 385/16; 385/15; 385/20
(58) Field of Search .......................... 385/15–19, 41, 385/20

(56) References Cited

U.S. PATENT DOCUMENTS

| 3,864,018 A | 2/1975 | Miller |
| 4,120,923 A | 10/1978 | Kloker et al. |
| 4,150,870 A | 4/1979 | d'Auria |
| 4,165,496 A | 8/1979 | Di Domenico, Jr. et al. |
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A | 4/1982 | Witte |
| 4,407,562 A | 10/1983 | Young |
| 4,415,229 A | 11/1983 | McCullough |
| 4,498,730 A | 2/1985 | Tanaka et al. |
| 4,639,074 A | 1/1987 | Murphy |
| 4,699,457 A | 10/1987 | Goodman |
| 4,725,114 A | 2/1988 | Murphy |
| 4,756,590 A | 7/1988 | Forrest et al. |
| 4,859,022 A | 8/1989 | Opdahl et al. |

(List continued on next page.)

FOREIGN PATENT DOCUMENTS

| DE | 3927441 | 2/1991 |
| EP | 0476241 | 3/1992 |
| JP | 6385522 | 4/1988 |
| JP | 1999305151 A | 11/1999 |

*Primary Examiner*—Michael C. Zarroli
(74) *Attorney, Agent, or Firm*—Niels Haun; Jonathan D. Baskin

(57) ABSTRACT

The present invention provides an optical switch. The switch includes a substrate and a first waveguide holding member. The switch also includes a second waveguide holding member disposed over the substrate and movable relative to the first waveguide holding member to provide a switching function. A movement guiding member is provided for guiding the movement of the second waveguide holding member. A registration element is disposed at the movement guiding member for positioning the second waveguide holding member at a selected location relative to the first waveguide holding member. The selected location is one that provides alignment between a selected waveguide of the first waveguide holding member and a selected waveguide of the second waveguide holding member.

13 Claims, 21 Drawing Sheets

U.S. PATENT DOCUMENTS

| | | |
|---|---|---|
| 4,900,118 A | 2/1990 | Yanagawa et al. |
| 4,932,745 A | 6/1990 | Blonder |
| 4,973,127 A | 11/1990 | Cannon, Jr. et al. |
| 5,044,711 A | 9/1991 | Saito |
| 5,123,073 A | 6/1992 | Pimpinella |
| 5,127,084 A | 6/1992 | Takahashi |
| 5,135,590 A | 8/1992 | Basavanhally et al. |
| 5,177,804 A | 1/1993 | Shimizu et al. |
| 5,179,609 A | 1/1993 | Blonder et al. |
| 5,181,216 A | 1/1993 | Ackerman et al. |
| 5,185,825 A | 2/1993 | Shigematsu et al. |
| 5,185,846 A | 2/1993 | Basavanhally et al. |
| 5,187,758 A | 2/1993 | Ueda et al. |
| 5,257,332 A | 10/1993 | Pimpinella |
| 5,297,228 A | 3/1994 | Yanagawa et al. |
| 5,337,384 A | 8/1994 | Basavanhally et al. |
| 5,357,590 A | 10/1994 | Auracher |
| 5,379,361 A | 1/1995 | Maekawa et al. |
| 5,390,266 A | 2/1995 | Heitmann et al. |
| 5,440,655 A | 8/1995 | Kaplow et al. |
| 5,461,683 A | 10/1995 | Harman |
| 5,483,608 A | 1/1996 | Yokomachi et al. |
| 5,499,309 A | 3/1996 | Kozuka et al. |
| 5,500,910 A | 3/1996 | Boudreau et al. |
| 5,500,911 A | 3/1996 | Roff |
| 5,555,333 A | 9/1996 | Kato |
| 5,566,262 A | 10/1996 | Yamane et al. |
| 5,568,585 A | 10/1996 | Kramer |
| 5,602,951 A | 2/1997 | Shiota et al. |
| 5,611,006 A | 3/1997 | Tabuchi |
| 5,623,564 A | 4/1997 | Presby |
| 5,699,463 A | 12/1997 | Yang et al. |
| 5,727,099 A | 3/1998 | Harman ............... 385/52 |
| 5,732,167 A | 3/1998 | Ishiko et al. |
| 5,757,991 A | 5/1998 | Harman ............... 385/16 |
| 5,778,123 A | 7/1998 | Hagan et al. |
| 5,785,825 A | 7/1998 | Hwang et al. |
| 5,828,800 A | 10/1998 | Henry et al. |
| 5,901,262 A | 5/1999 | Kobayashi et al. |
| 5,909,524 A | 6/1999 | Tabuchi |
| 5,920,665 A | 7/1999 | Presby |
| 6,045,270 A | 4/2000 | Weiss et al. |
| 6,056,696 A | 5/2000 | Kallman |
| 6,064,781 A | 5/2000 | Seibold et al. |
| 6,101,299 A | 8/2000 | Laor |
| 6,118,917 A | 9/2000 | Lee et al. |
| 6,160,936 B1 | 12/2000 | You et al. |
| 6,234,687 B1 | 5/2001 | Hall et al. |
| 6,320,997 B1 | 11/2001 | Dautartas et al. |
| 6,328,479 B1 | 12/2001 | Schofield et al. |
| 6,393,174 B1 | 5/2002 | Karaguleff et al. |
| 6,393,175 B1 | 5/2002 | Jurbergs et al. |
| 6,477,303 B1 | 11/2002 | Witherspoon |
| 6,519,382 B1 | 2/2003 | Jurbergs et al. |
| 6,625,356 B2 | 9/2003 | Ticknor et al. ............... 385/39 |
| 2001/0041026 A1 | 11/2001 | Steinberg et al. |
| 2002/0025104 A1 | 2/2002 | Steinberg et al. |
| 2002/0025107 A1 | 2/2002 | Heiks et al. |
| 2002/0028037 A1 | 3/2002 | Steinberg et al. |
| 2002/0146194 A1 | 10/2002 | Sherrer et al. |
| 2003/0108272 A1 | 6/2003 | Sherrer et al. |

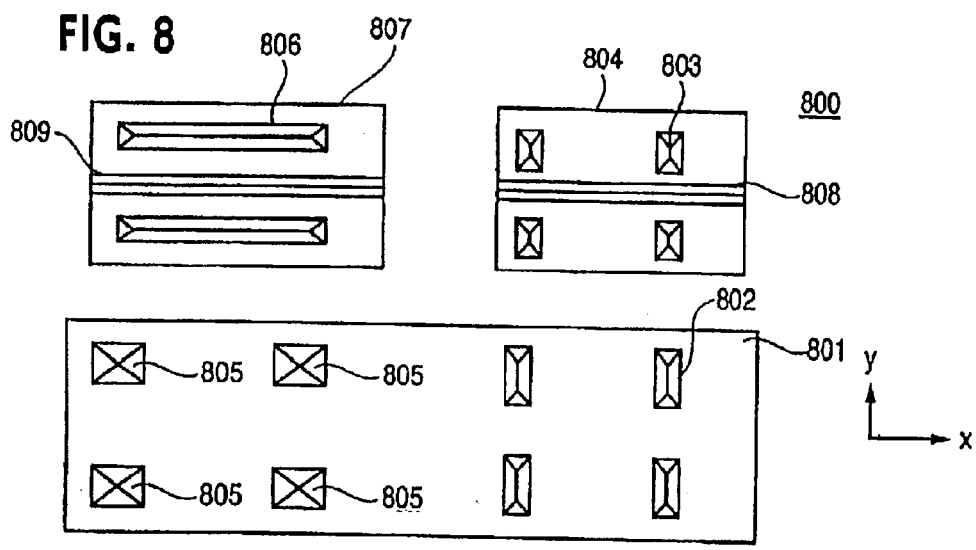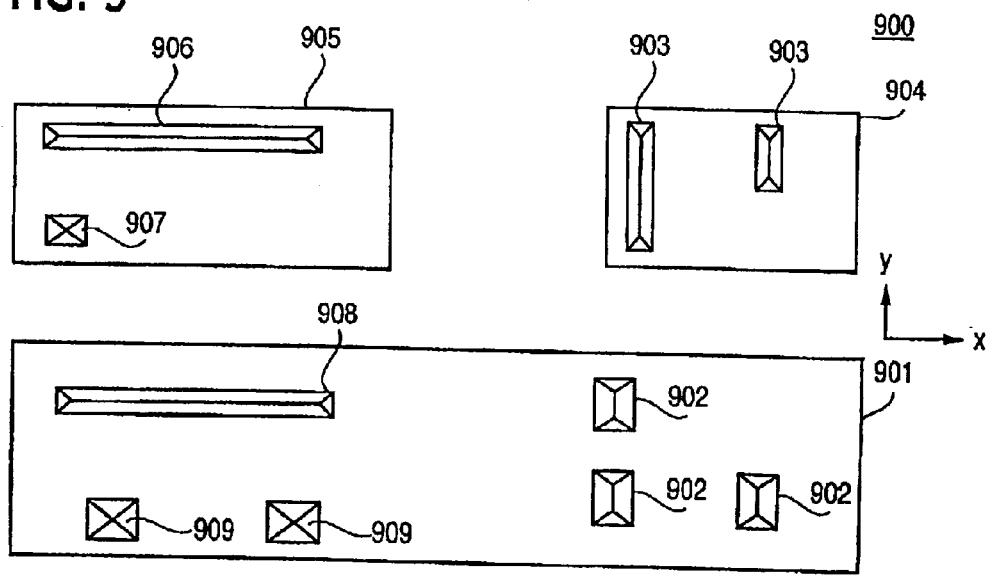

OPTICAL WAVEGUIDE SWITCH

RELATED APPLICATIONS

The present application is a continuation-in-part of U.S. patent application Ser No. 09/835,106 entitled "Optical waveguide switch", filed Apr. 13, 2001, which in turn claims the benefit of priority of both U.S. Provisional Patent Application 60/197,154 entitled "Fiber Array Switch Having Micromachined Front Face," filed Apr. 13, 2000 and U.S. Provisional Patent Application 60/201,347 entitled "Optical Fiber Array Switches and Alternative Embodiments," filed May 2, 2000. The present application is also a continuation-in-part of U.S. patent application Ser No. 09/833,282 entitled "Fiber Optic Array Switch", filed Apr. 12, 2001, now U.S. Pat. No. 6,798,933 which claims the benefit of priority of U.S. Provisional Patent Application 60/197,120, filed on Apr. 14, 2000. The disclosures of the above-captioned patent applications are specifically incorporated by reference as though reproduced in their entirety herein.

FIELD OF THE INVENTION

The present invention relates generally to optical waveguide switches, and in particular to an array (M×N) optical switch.

BACKGROUND OF THE INVENTION

The increasing demand for high-speed voice and data communications has led to an increased reliance on optical communications, particularly optical fiber communications. The use of optical signals as a vehicle to carry channeled information at high speeds is preferred in many instances to carrying channeled information at other electromagnetic wavelengths/frequencies in media such as microwave transmission lines, co-axial cable lines and twisted pair transmission lines. Advantages of optical media are, among others, high-channel capacity (bandwidth), greater immunity to electromagnetic interference, and lower propagation loss. In fact, it is common for high-speed optical communication systems to have signal rates in the range of approximately several Giga bits per second (Gbit/sec) to approximately several tens of Gbit/sec.

One way of carrying information in an optical communication system, for example an optical network, is via an array of optical fibers. Ultimately, the optical fiber array may be coupled to another array of waveguides, such as another optical fiber array, or a waveguide array of an optoelectronic integrated circuit (OEIC). In order to assure the accuracy of the coupling of the fiber array to another waveguide array, it becomes important to accurately position each optical fiber in the array.

Optical switches serve a variety of applications in optical communication systems. Once such variety of optical switches are mechanical switches. Mechanical optical switches have been used in a variety of optical fiber routing applications to switch between particular optical signal pads to provide reliable optical transmission routes for carrying optical signals.

Many mechanical optical switch configurations which are commercially available are typically characterized as either optical-component-moving-type or fiber-moving-type switch configurations. Illustratively, optical-component-moving-type switches include configurations that employ movable optical element (e.g. mirrors or prisms) to selectively redirect signals from an end of a first optical fiber to an end from a second optical fiber wherein the optical fibers are arranged in a parallel manner with their ends adjacent one another. While beneficial optical-component-moving-type switches typically elaborate and often too expensive for large scale implementation.

Conventional fiber-moving-type switch configurations may provide multiple-port switching. However, these types of optical switches suffer from complexity, expense and chronically poor alignment which requires frequent and labor intensive adjustment. The relative complexity of conventional fiber-moving-type switches has resulted in prohibitive cost and relatively high alignment tolerances which ultimately impair the performance of the device.

Accordingly, what is needed is a relatively simple, inexpensive, mechanically stable optical switch configuration capable of providing multiple-port switching in a variety of optical applications.

SUMMARY OF THE INVENTION

The present invention provides an optical switch, comprising: a substrate having an upper surface; a first waveguide holding member disposed over the upper substrate surface; a second waveguide holding member disposed over the upper substrate surface and slidably movable relative to the first waveguide holding member to provide a switching function; and a movement guiding member disposed between the upper substrate surface and the second waveguide holding member for guiding the movement of the second waveguide holding member, the movement guiding member comprising at least one detent for positioning the second waveguide holding member at a selected location relative to the first waveguide holding member to selectively couple a waveguide of the second waveguide holding member to a waveguide of the first waveguide holding member.

The at least one detent may comprise a plurality of detents which define preferred locations of the second waveguide holding member. The preferred locations provide alignment between waveguides of the first waveguide holding member and waveguides of the second waveguide holding member. The movement guiding member may comprise a positioning member, such as a sphere or a rod, for engagement with the detents. The movement guiding member may also comprise a plurality of registration elements between which the detents are located. The registration elements may comprise a plurality of rods or spheres that are adjacent to one another. The regions between the adjacent rods or spheres provide the detents.

BRIEF DESCRIPTION OF THE DRAWINGS

The foregoing summary and the following detailed description of the preferred embodiments of the present invention will be best understood when read in conjunction with the appended drawings, in which:

FIGS. 6-9 schematically illustrate top views of substrates and waveguide holding members according to exemplary embodiments of the present invention;

DEFINED TERMS

1. As used herein, the term "on" may be directly on. Alternatively "on" may mean "over."

2. As used herein, "longitudinal" means parallel to the optic axis of a waveguide (x-direction herein); "transverse" means perpendicular to the optic axis of a waveguide (y-direction herein).

3. As used herein, "movement guiding member" means a device or structure which constrains movement along a selected path, such as a linear or arcuate path.

DETAILED DESCRIPTION OF THE INVENTION

According to an exemplary embodiment of the present invention, an optical switch includes a first waveguide holding member and a second waveguide holding member disposed on a substrate. The first waveguide holding member moves relative to the second waveguide holding member. A movement guiding member guides the motion of the first waveguide holding member.

Advantageously, the first waveguide holding member moves transversely relative to the second waveguide holding member. The traverse motion enables selective coupling between a waveguide in the first waveguide holding member and a waveguide in the second waveguide holding member. Through this transverse motion of the second waveguide holding member, an optical switching action may be implemented.

Figure 1:
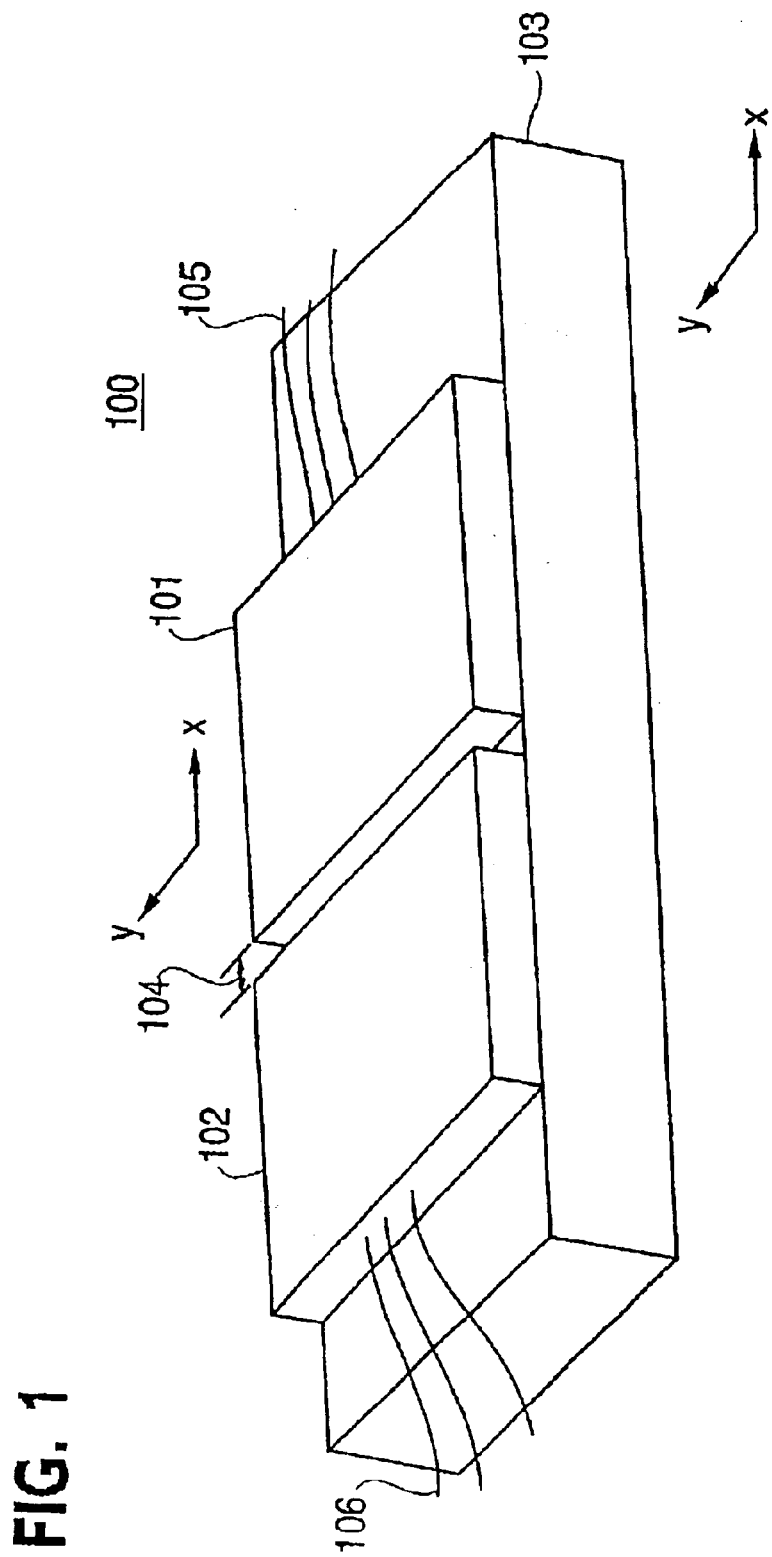
FIG. 1 schematically illustrates a perspective view of an optical fiber switch according to an exemplary embodiment of the present invention.

FIG. 1 shows an optical switch 100 according to an illustrative embodiment of the present invention. A first waveguide holding member 101 and a second waveguide holding member 102 are disposed over a substrate 103. Optical waveguides 105 and 106 are disposed in the first waveguide holding member 101 and the second waveguide holding member 102, respectively. The waveguides 105 and 106 within the first and second waveguide holding members are selectively optically coupled to one another. To this end, a gap spacing 104 between the first waveguide holding member 101 and the second waveguide holding member 102 may be set so that efficient optical coupling is achieved between selected waveguides in the first waveguide holding member 101 and the second waveguide holding member 102.

After the gap spacing 104 has been set via longitudinal motion (x-direction) of the second waveguide holding member 102 relative to the first waveguide holding member 101, transverse (y-direction) motion may be carried out to selectively couple/decouple optical waveguide(s) in the first waveguide holding member 101 to an optical waveguide(s) in the second waveguide holding member 102. Accordingly, by virtue of the transverse motion of the first waveguide holding member 101 relative to the second waveguide holding member 102 the coupling decoupling of waveguides may be used to achieve optical switching between selected waveguides.

Illustratively, the motion of the first waveguide holding member 101 and the second waveguide holding member 102 may be through the use of known mechanical actuators. These include, but are not limited to, electromagnetic, piezoelectric, microelectro-mechanical system (MEMs), and hydraulic devices.

Illustratively, waveguides 105 and 106 are optical fibers. However, they may be planar waveguides as well. The waveguides 105 and 106 may be disposed on the lower surfaces of the first and second waveguide holding members 101 and 102, respectively. This substantially avoids alignment problems due to variations in thicknesses of first and second waveguide holding members 101 and 102, respectively. Moreover, this placement of waveguides 105 and 106 substantially avoids front-side and back-side alignment errors. However, the optical waveguides may be located on the top surfaces of or within first and second waveguide holding members 101 and 102.

Figure 28:
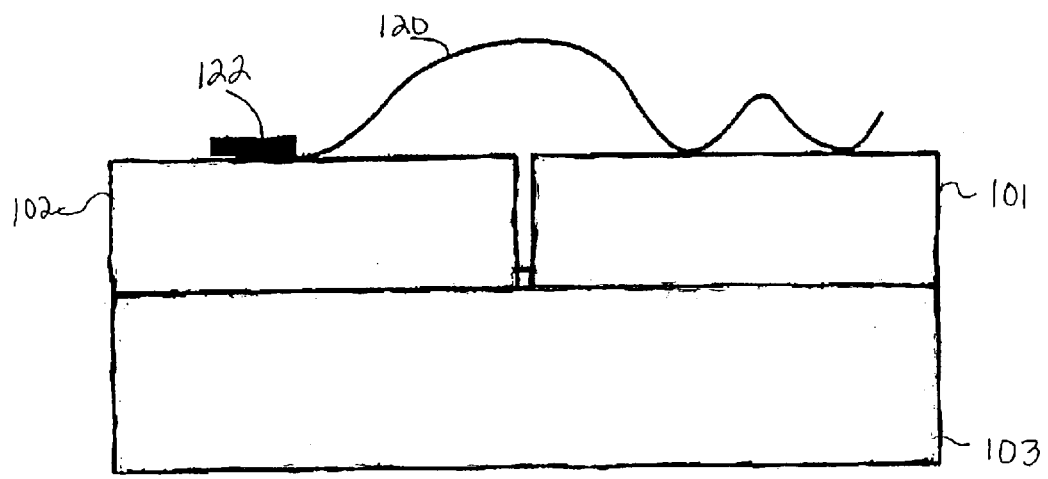
FIG. 28 schematically illustrates a side elevational view of the exemplary embodiment of FIG. 1, but having a spring to bias the first waveguide holding member towards the substrate.

In the illustrative embodiment shown in FIG. 1, a movement guiding member (not shown) may be disposed so that the first waveguide holding member 101 moves transversely. Moreover, a similar movement guiding member may be disposed so that the second waveguide holding member 102 moves longitudinally. The longitudinal motion of the second waveguide holding member 102 allows adjustment of the gap spacing 104. For purposes of illustration and not limitation, after the gap spacing 104 has been set, the second waveguide holding member 102 may be secured in position by use of a suitable adhesive. For example, a suitable epoxy may be used to secure the second waveguide holding member 102 in position. Moreover, the second waveguide holding member 102 may be adhered to the substrate 103 by thermo-compression bonding with aluminum. The gap spacing may be in the range of 1 $\mu$m to 15 $\mu$m, for example. In addition, as illustrated in FIG. 28, a spring 120 may be provided above the first and second waveguide holding members 101, 102 to press the first waveguide holding member 101 towards the substrate 103. The spring 120 may be attached to the top of the second waveguide holding member 102 via a spring attachment 122, which may be an epoxy, for example. It is also of interest to note that the second waveguide holding member 102 may be located so that the gap spacing is set without longitudinal motion. This may be achieved through use of alignment fiducials or other suitable devices.

In this illustrative embodiment, the second waveguide holding member 102 may also be capable of transverse (y-direction) motion. This may be accomplished using a suitably disposed movement guiding member to achieve transverse motion. As such, the switching capabilities of the optical switch 100 may be achieved by movement of one or both of the first and second waveguide holding members 101 and 102, respectively.

Figure 2:
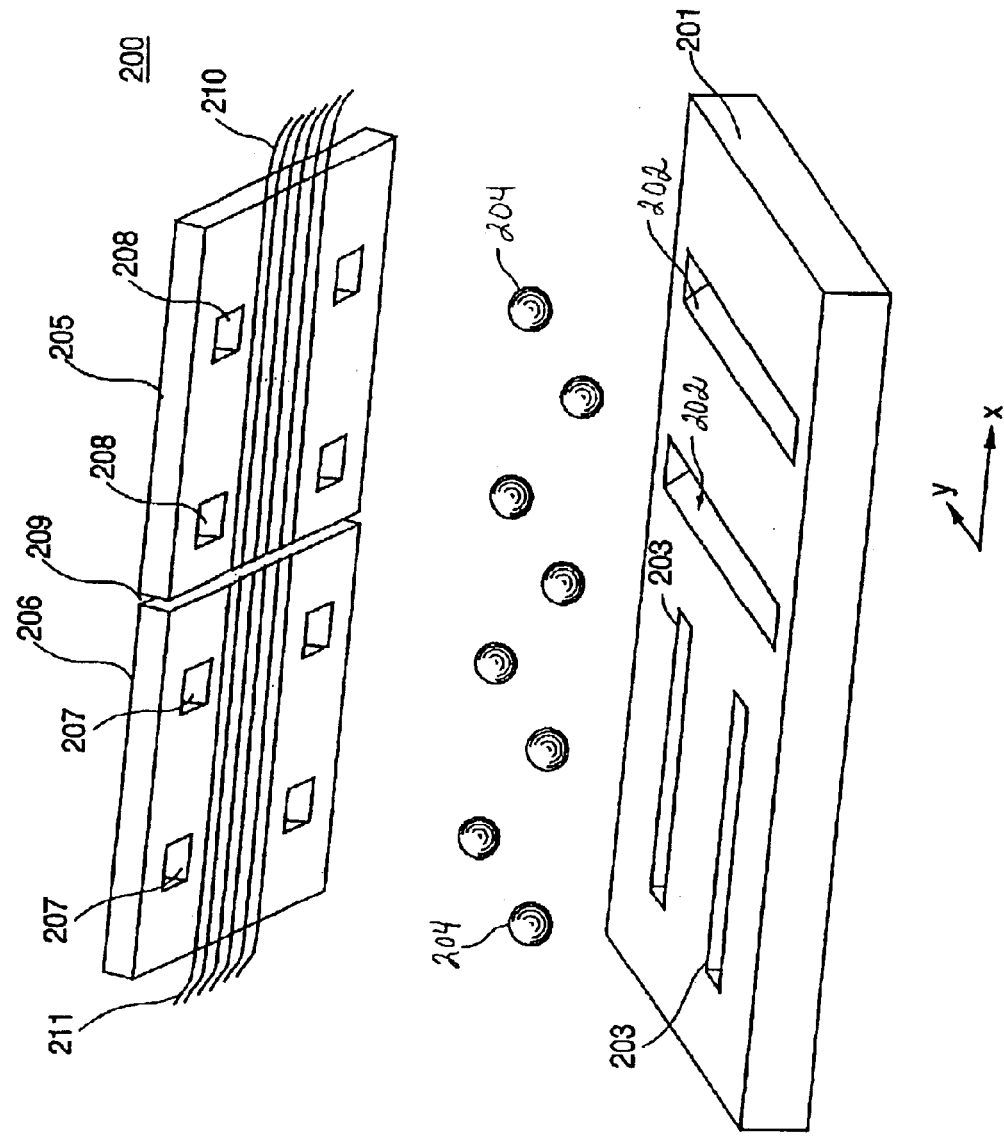
FIG. 2 schematically illustrates an exploded view of an optical switch according to an exemplary embodiment of the present invention.

Turning to FIG. 2, an exploded view of an optical switch 200 according to an exemplary embodiment of the present invention is shown. A substrate 201 illustratively includes longitudinal grooves 203 and transverse grooves 202. The longitudinal grooves 203 and transverse grooves 202 are adapted to receive positioning members 204. The positioning members 204 are illustratively microspheres and may be other suitable friction-reducing elements that can translate within the grooves 202, 203, such as sliding or rolling elements. Selected positioning members 204 are disposed between the longitudinal grooves 203 of the substrate 201 and pits 207 in second waveguide holding member 206. Additional selected positioning members 204 are positioned between the transverse grooves 202 of the substrate 201 and pits 208 in first waveguide holding member 205. As can be readily appreciated the longitudinal and transverse grooves 202, 203 of the substrate 201 and the pits 208, 207 in the first and second waveguide holding members 205, 206, respectively are on opposing surfaces thereof.

Illustratively, transverse motion of the first waveguide holding member 205 is achieved by motion of the positioning members 204 in grooves 202. The positioning members 204 associated with the first waveguide holding member 205 are constrained relative to the first waveguide holding member 205 by pits 208 in the first waveguide holding member 205. Likewise, the positioning members 204 associated with the second waveguide holding member 206 are constrained relative to the first waveguide holding member 205 in pits 207 in the second waveguide holding member 206. Longitudinal motion of second waveguide holding member 206 is achieved through the motion of the positioning members 204 in the longitudinal grooves 203 of the substrate 201.

The longitudinal motion may be used to adjust gap spacing 209 between the first waveguide holding member 205 and the second waveguide holding member 206. Transverse motion of the first waveguide holding member 205 may be used to achieve switching between waveguides 210 and 211. To this end, switching is achieved by selectively coupling/decoupling waveguides 211 disposed in first waveguide holding member 205 with waveguides 210 disposed in second waveguide holding member 206. Finally, it is of interest to note that waveguides 210 and 211 may be disposed on the lower surfaces of the first and second waveguide holding members 205 and 206, respectively. They may be held in v-grooves (not shown), for example. Moreover, the waveguides 210 and 211 may be disposed on the top surfaces of the waveguide holding members 205 and 206, respectively. Finally, waveguides 210 and 211 may be disposed within waveguide holding members 205 and 206, thereby being integral parts thereof.

Figure 3:
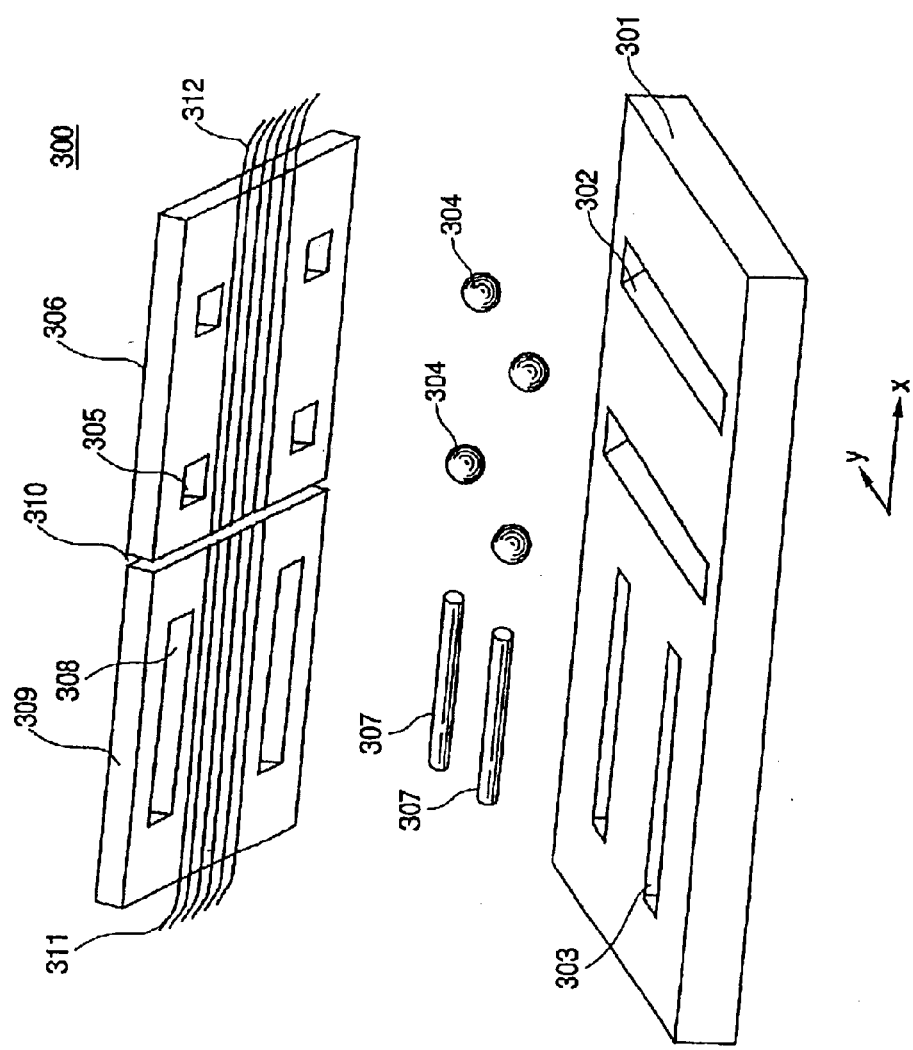
FIG. 3 schematically illustrates an exploded view of an optical switch according to an exemplary embodiment of the present invention.

FIG. 3 shows an optical switch 300 according to another illustrative embodiment of the present invention. A substrate 301 has transverse grooves 302 and longitudinal grooves 303. Positioning members 304 are disposed between transverse grooves 302 and pits 305 in first waveguide holding member 306. The positioning members 304 are constrained in pits 305 and move along longitudinal grooves 302, which enables transverse motion of first waveguide holding member 306 in a manner similar to that described in connection with the illustrative embodiment of FIG. 2.

Positioning members 307 are disposed between longitudinal grooves 303 in substrate 301 and grooves 308 disposed in second waveguide holding member 309. Positioning members 307 are illustratively cylindrical-shaped rod elements which enable the longitudinal motion (x-direction) of first waveguide holding member 306. Illustratively, positioning members 307 may be sections of optical fiber or micromachined rods. Moreover, positioning members 304, 307 may be glass, metal or ceramic. Similar to the illustrative embodiment of FIGS. 1 and 2 the longitudinal motion of second waveguide holding member 309 enables the adjustment of the gap spacing 310 between the first waveguide holding member 306 and the second waveguide holding member 309 to facilitate coupling of optical fibers 311 and 312.

In the illustrative embodiments of FIGS. 2 and 3, the grooves 202, 203, 302, 303 and 308 may be illustratively v-shaped grooves. The pits 207, 208 and 305 are illustratively invented pyramidal-shaped pits. The grooves and pits may be formed by illustrative techniques described below. Finally, in the illustrative embodiments of FIGS. 2 and 3, the first waveguide holding members 205, 306 and the second waveguide holding member 206 each include four pits which constrain positioning members 204 and 304. As can be readily appreciated, three pits are desirable for stability and motion constraint. Other numbers of pits and positioning members may be used in keeping with the present invention. Finally, the grooves 202, 203, 302, 303, 308, pits 207, 208, 305, and positioning members 204, 304 may be coated with a coating material to reduce wear and/or friction, such as silicon nitride, for example. The coating material may be selected with regard to the sliding and frictional properties and may be selected to have a low coefficient of friction, low wear, and long life so that the fiber alignment is not negatively affected by material wear.

The inverted pyramidal pits and grooves may be formed by anisotropic wet etching of a monocrystalline material, such as single crystal silicon. Illustratively, the monocrystalline material may be selectively etched according to known techniques. The surfaces of the inverted pyramidal pits are disposed along the well-defined crystallographic planes of the monocrystalline material. One such known technique for anisotropic etching of monocrystalline material may be found in U.S. Pat. No. 4,210,923 to North, et al., the disclosure of which is specifically incorporated herein by reference. Of course, other known etching techniques (wet or dry) may be used to form the pits and grooves. Moreover, other materials may be used for the substrate and first and second waveguide holding members. These include, but are not limited to, glass, quartz, metal or plastic. The grooves and pits may be formed therein by known techniques, such as molding.

In the illustrative embodiments of the present invention, a movement guiding member may comprise a positioning member disposed between a pit and a groove. The pits may be located in the waveguide holding member or in the substrate depending on application. Moreover, a movement guiding member may comprise a positioning member disposed between two grooves. Again, the grooves may be located in the substrate and in the waveguide holding member. Again, this is merely illustrative of the movement guiding members of the exemplary embodiments of the present invention, and other movement guiding members may be used in carrying out the invention.

Figure 4:
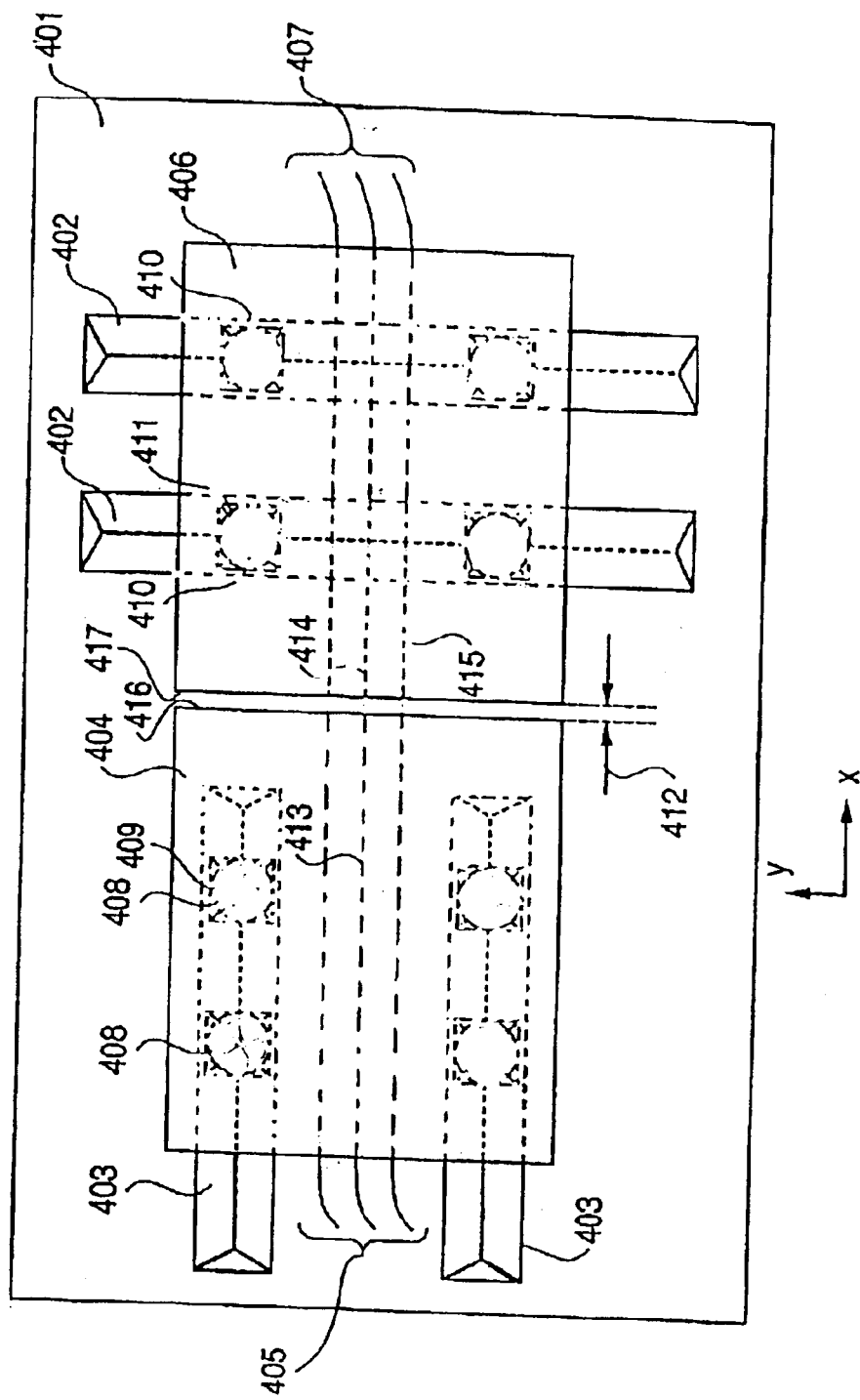
FIG. 4 schematically illustrates a top view of an optical switch according to yet another exemplary embodiment of the present invention.

FIG. 4 shows an optical switch 400 according to an illustrative embodiment of the present invention. A substrate 401 has transverse v-grooves 402 disposed therein The substrate 401 further includes longitudinal v-grooves 403. A first waveguide holding member 404 includes first waveguides 405. The waveguides 405 may be disposed on top of the first waveguide holding member 404; on the bottom of first waveguide holding member 404; or within the first waveguide holding member 404. A second waveguide holding member 406 includes second waveguides 407. The second waveguides 407 may be disposed on a top surface of the second waveguide holding member 406; a bottom surface of second waveguide holding member 406; or within the second waveguide holding member 406. Waveguides 405 and 407 are illustratively optical fibers. However, waveguides 405 and 407 may be planar waveguides. In the illustrative embodiment of FIG. 4, first positioning members 408 are disposed in pits 409 in the first waveguide holding member 404. Likewise, second positioning members 410 are disposed in pits 411 in the second waveguide holding member 406.

As described above, the pits 409 are illustratively inverted pyramidal pits. The first positioning members 408 are relatively contained within the pits 409 and cooperatively engage the longitudinal grooves 403. Illustratively, a movement guiding member may comprise a first positioning member 408 disposed between a pit 409 and a longitudinal groove 403. In the illustrative embodiment shown in FIG. 4, such a configuration provides for motion of the first waveguide holding member 404 in the ±x-direction. As can be readily appreciated, motion in the ±x-direction facilitates the longitudinal alignment of the first waveguides 405 relative to the second waveguides 407. Particularly, the constrained linear motion of the first waveguide holding member 404 in the longitudinal direction enables the proper selection of the gap spacing 412.

Illustratively, a movement guiding member may comprise a second positioning member 410 disposed between a pit 411 and a transverse groove 402 of second waveguide holding member 406. The second positioning members 410 are disposed in pits 411. Again, the second positioning members 410 are constrained in the pits 411, which are illustratively inverted pyramids. The second positioning members 410 are constrained by grooves 402 to move in the traverse direction. In the illustrative embodiment shown in FIG. 4, this results in the transverse motion of the second waveguide holding member 406 in the ±y-direction.

The transverse motion of waveguides 407 relative to waveguides 405 enables the selective coupling/ decoupling of waveguides. This facilitates the switching of a signal from one waveguide to another. For example, an optical signal may be traversing waveguide 413 of the first waveguide holding member 404. This waveguide may be coupled to waveguide 414 disposed in second waveguide holding member 406. As can he readily appreciated, movement of the second waveguide holding member 406 in either the +y-direction or the −y-direction may uncouple waveguide 413 from waveguide 414. Movement in the +y-direction, for example of a predetermined distance may enable coupling of the optical signal traversing waveguide 413 into waveguide 415. As such, coupling of the optical signal is "switched" from waveguide 414 to waveguide 415.

In the exemplary embodiment, waveguides 405 and 407 each comprise a row of three waveguides. Of course, this is for purposes of illustration, and more or fewer waveguides may be used. Moreover, as can be readily appreciated, waveguides 405 of the first waveguide holding member 404 may be a linear array (a row) or a matrix of a suitable number of rows and columns of optical waveguides. Likewise, optical waveguides 407 of the second waveguide holding member 406 may also be a linear array (a row) or a matrix having a suitable number of rows and columns. Moreover, the pitch between the waveguides 405 may be the same or different than that of the waveguides 407. As such, sophisticated switching schemes may be realized through the transverse motion of the second waveguide holding member 406 relative to the first waveguide holding member 404.

Figure 5:
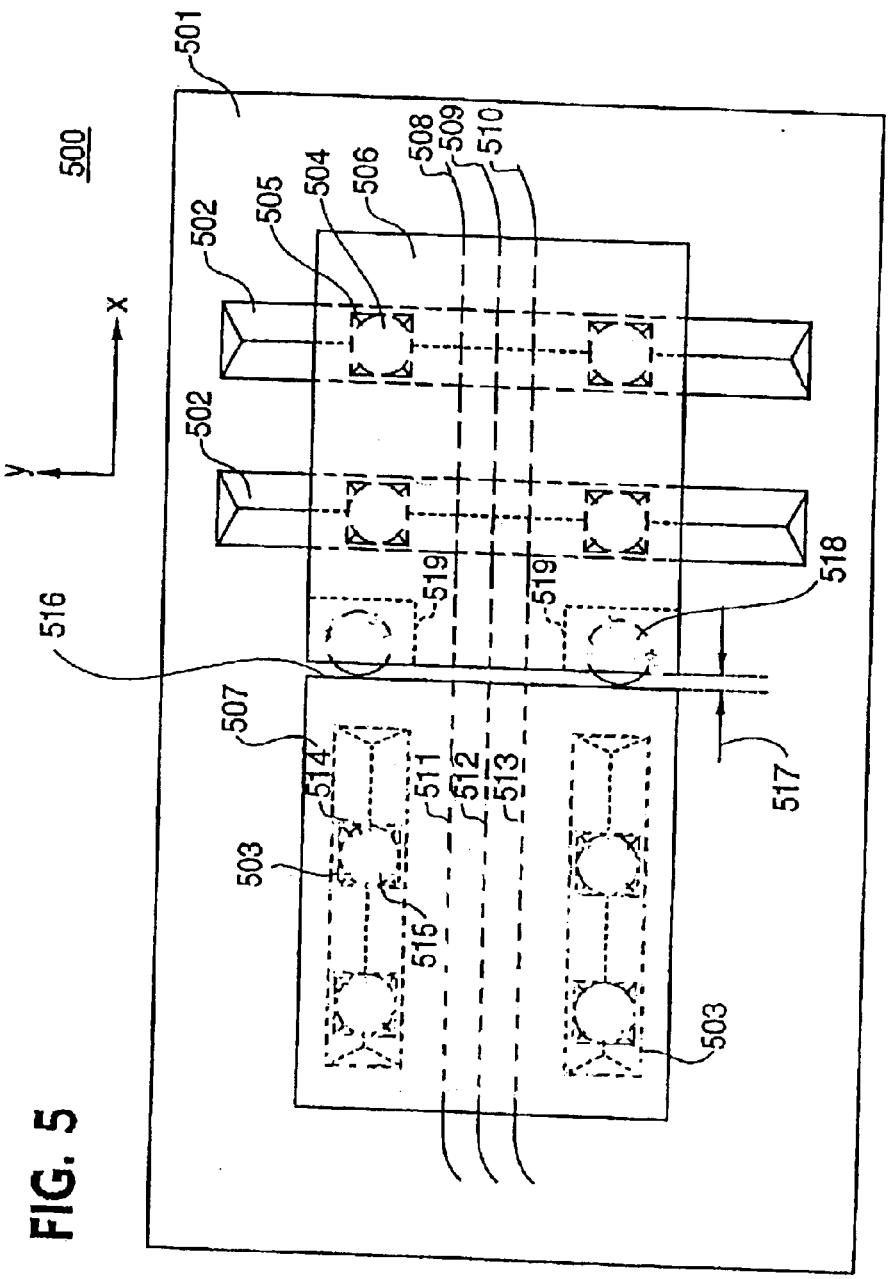
FIG. 5 schematically illustrates a top view of an optical switch according to yet another exemplary embodiment of the present invention.

FIG. 5 shows an optical switch 500 according to another illustrative embodiment of the present invention. A substrate 501 has transverse grooves 502 disposed therein. The substrate 501 also includes longitudinal grooves 503. The transverse grooves 502 receive positioning members 504 which are disposed in pits 505 in the second waveguide holding member 506. In the present illustrative embodiment, movement guiding members may comprise a positioning member 504 disposed between pits 505 and transverse grooves 502.

The motion of the positioning members 504 in the transverse grooves 502 enables the transverse motion (y-direction) of the second waveguide holding member 506 relative to the first waveguide holding member 507. The transverse motion enables the selective coupling/decoupling of optical waveguides 508, 509 and 510 to waveguides 511, 512 and 513, respectively. Transverse motion of the second waveguide holding member 506 would change this coupling, enabling a switching action.

In the illustrative embodiment of FIG. 5, positioning members 514 are disposed in pits 515 in the second waveguide holding member 507. As can be readily appreciated, the engagement of the positioning members 514 within the longitudinal grooves 503 in the substrate 501 enables longitudinal movement (x-direction) of the second waveguide holding member 507. According to the illustrative embodiment of FIG. 5, the second waveguide holding member 507 may have an endface 516 which is polished. The gap spacing 517 may be accurately determined by elements 518 which are illustratively ball lenses or microspheres disposed in grooves 519 the first waveguide holding member 506. The gap spacing 517 is illustratively in the range of 1 μm to 15 μm.

FIGS. 6–9 are illustrative embodiments of substrate and waveguide holding members according to the present invention. These embodiments are intended to be illustrative of different combinations of grooves and pits which will allow the relative transverse motion of the first and second waveguide holding members for optical switching. These exemplary embodiments also provide longitudinal motion to adjust a gap spacing between the first and second waveguide holding members. These embodiments are intended to be illustrative, and in no way exhaustive of the combinations of the location of grooves and pits that can be used to carry out the invention of the present disclosure.

Figure 6:
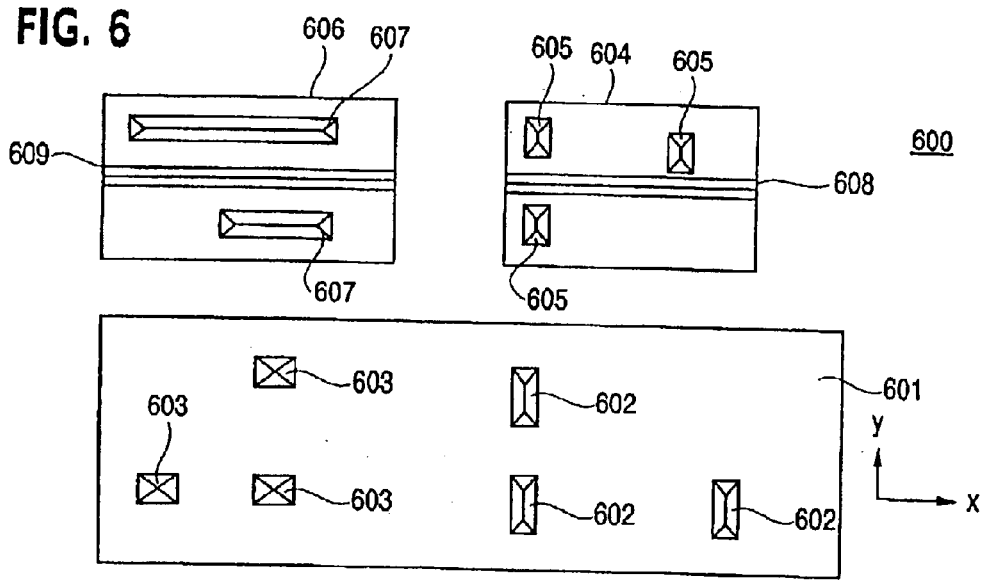

FIG. 6 shows the elements of an optical switch 600 according to an illustrative embodiment of the present invention. A substrate 601 includes grooves 602 and pits 603. Again, the grooves 602 and pits 603 are fabricated by known techniques as described in detail above. The grooves 602 and pits 603 are adapted to received positioning members (not shown) to such as those described in the connection with the illustrative embodiments above. A first waveguide holding member 604 includes grooves 605. The grooves 605 having the positioning members (not shown) therein which enable the transverse motion (y-direction) of the first waveguide holding member 604. The second waveguide holding member 606 has grooves 607 therein. The grooves 607 which are adapted to receive the positioning members (not shown) enable the longitudinal motion (x-direction) of the second waveguide holding member 606. Again, the transverse motion of the first waveguide holding member 604 relative to the second waveguide holding member 606 enables the switching operation of waveguides 608 and 609. The longitudinal motion of the second waveguide holding member 606 enables the optical coupling of the optical fibers 608 and 609 by adjusting the gap spacing therebetween. In the illustrative embodiment shown in FIG. 6, it may be useful to adhere the second waveguide holding member 606 to the substrate 601 after the gap spacing has been set.

Figure 7:
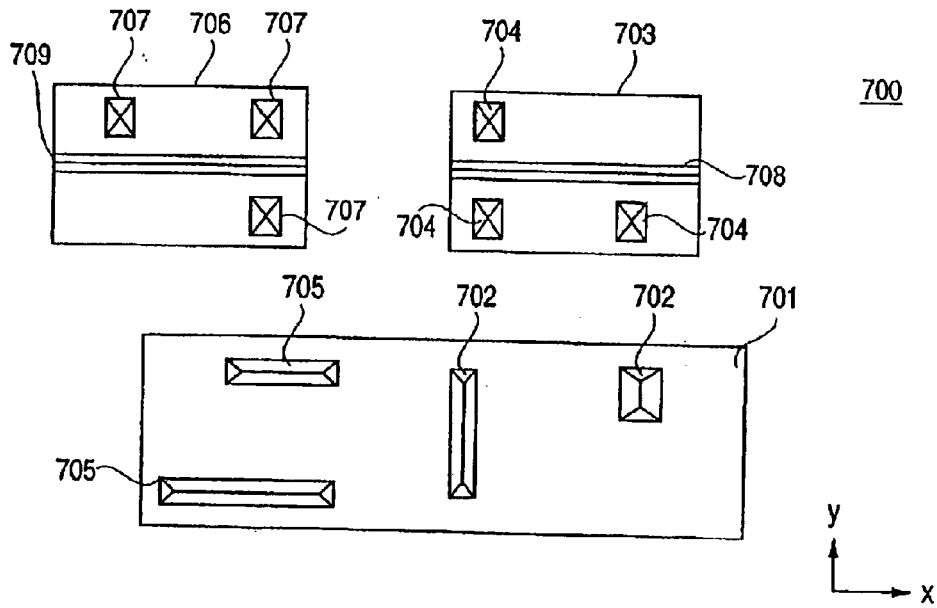

FIG. 7 shows another optical-switch 700 according to yet another illustrative embodiment of the present invention. The substrate 701 has grooves 702 which cooperatively engage positioning members (not shown) enabling transverse motion of the first waveguide holding member 703. The positioning members are disposed in pits 704 in the first waveguide holding member 703. Longitudinal grooves 705 receive positioning members (not shown) which are disposed in pits 707 in the second waveguide holding member 706. This enables longitudinal movement of the second waveguide holding member 706.

As described in connection with the illustrative embodiments above, waveguides 708 and 709 are selectively coupled/decoupled with the transverse motion of the first waveguide holding member 703 relative to the second waveguide holding member 706. Moreover, the longitudinal motion of the second waveguide holding member 706 enables accurate gap spacing between the first waveguide holding member 703 and the second waveguide holding member 706, thereby enabling efficient coupling between the waveguides 708 and 709. After the gap spacing is adjusted, a suitable adhesive may be used to fix the position of the second waveguide holding member 706 and thereby set the gap spacing at the determined position.

FIG. 8 shows an optical switch 800 according to yet another illustrative embodiment of the present invention. In the illustrative embodiment of FIG. 8, a substrate 801 has transverse grooves 802 which cooperatively engage positioning members (not shown) which may be disposed in grooves 803 in the first waveguide holding member 804. As can be readily appreciated, the arrangement of the grooves 802 and 803 with the positioning member disposed therebetween enables the transverse motion of the first waveguide holding member 804. Pits 805 receive positioning members (not shown). These positioning members are disposed in grooves 806 in second waveguide holding member 807. Again, the longitudinal motion of the second waveguide member enables the coupling of waveguides 808 to waveguides 809 by setting the appropriate gap spacing between the waveguide holding members 804 and 807. The transverse motion of the first waveguide holding member 804 relative to the second waveguide holding member 807 results in the selective coupling/decoupling of waveguides 808 and 809 which enables the desired switching action.

FIG. 9 shows an optical switch 900 according to yet another illustrative embodiment of the present invention. A substrate 901 has transverse grooves 902 which cooperatively engage positioning members (not shown). The positioning members also cooperatively engage grooves 903 disposed in the first waveguide holding member 904. As can be readily appreciated, the arrangement of grooves 902 and 903 with the positioning members disposed therebetween enables transverse motion of the first waveguide holding member 904. Second waveguide holding member 905 includes a groove 906 and a pit 907. The substrate 901 includes a groove 908 and pits 909. Positioning members (for example microspheres) may be positioned in pits 909 of the second waveguide holding member 905. These positioning members engage groove 906. A positioning member may also be disposed in pit 907. This positioning member may engage the groove 908 of the substrate 901. The combination of grooves 906, 908 and pits 907, 909 in the second waveguide holding member 905 and the substrate 901 enables the longitudinal motion of the second waveguide holding member 905.

In another aspect of the present invention, the movement guiding members may be provided with registration elements to create regions in which a positioning member preferentially seats. The preferential seating of the positioning member positions the first and second waveguide holding members relative to one another so that selected fibers in each holding member are in proper alignment. Thus, cooperation between the registration elements and a positioning member creates preferred switching locations to provide a multiple-position, passive alignment mechanism for the switch.

Figure 10:
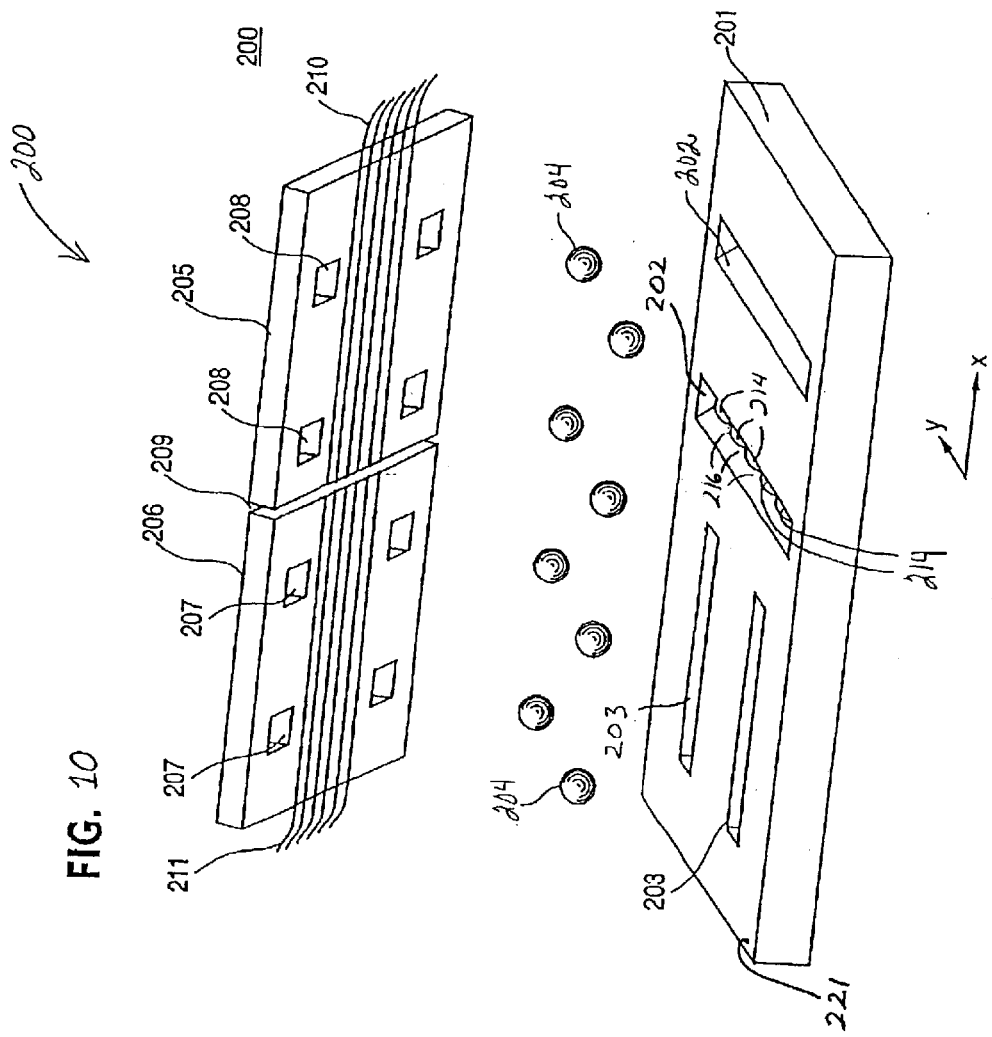
FIG. 10 schematically illustrates an exploded view of the switch of FIG. 2, but having registration spheres disposed in one of the transverse grooves of the substrate which cooperate with a positioning sphere to facilitate passive alignment of optical fibers at multiple switch positions.
Figure 11:
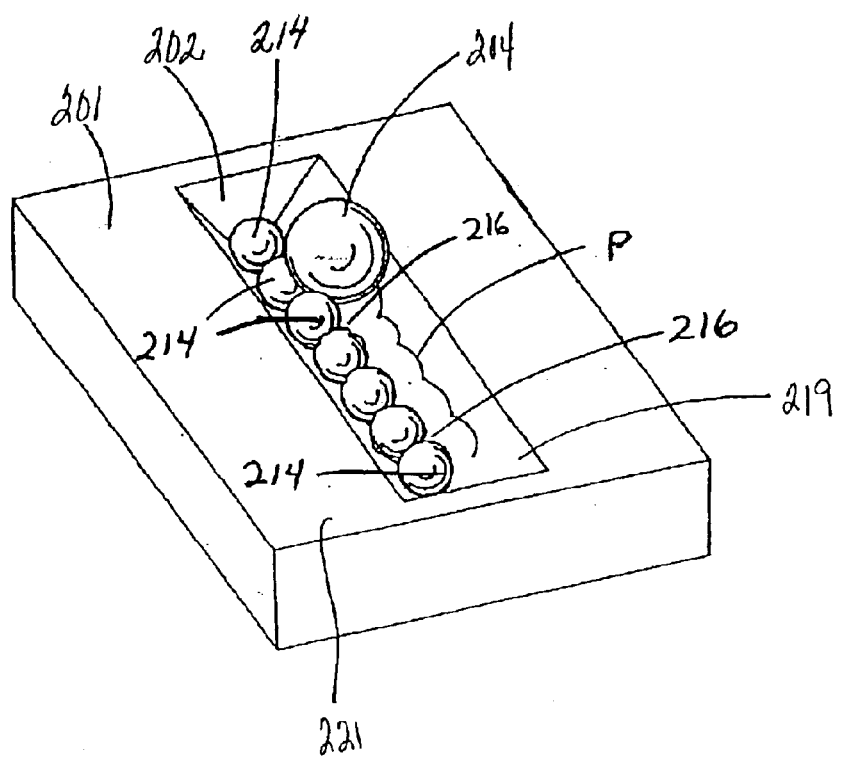
FIG. 11 schematically illustrates a perspective view of a portion of a multiple position passive alignment mechanism of the present invention in which registration elements are provided within a groove of the switch.

For example, referring to FIGS. 10 and 11, a modified version of the switch 200 of FIG. 2 is shown in which several registration elements 214, such as microspheres, are disposed within a transverse groove 202 of the substrate 201. FIG. 11 illustrates an enlarged perspective view of a portion of the substrate 201 showing the transverse groove 202 with the registration elements 214 disposed therein.

The registration elements 214 are disposed adjacent one another within the transverse groove 202 to provide detents 216 between adjacent pairs of registration elements 214. As used herein, "adjacent" elements, such as registration elements 214, maybe near one another or maybe in contact with one another. The detents 216 provide regions along the transverse groove 202 in which a positioning member 204, such as a positioning sphere, can preferentially seat. As explained above, the positioning member 204 may be simultaneously retained within a pit 208 of the first waveguide holding member 205, so that the first waveguide holding member 205 tracks the motion of the retained positioning member 204. As illustrated in FIG. 11, as the positioning member 204 translates along the length of the transverse groove 202, the positioning member 204 follows a path, P, in which the preferred seating locations of the positioning member 204 are located within the detents 216 at the cusps of the path, P. The positioning member 204 and/or registration elements 214 may be coated with a wear-resistant material such as a suitable carbide or nitride material.

The registration elements 214 may be microspheres that may be dimensioned to fit within the transverse groove 202 so that the registration elements 214 lie below the plane of the upper surface 221 of the substrate 201. Such a configuration provides three point contact for the positioning member 204 in the detents 216. Two of the contact points are located on adjacent registration elements 214, and the third contact point is located on a sidewall 219 of the transverse groove 202. The location and number of detents 216 provided by the registration elements 214 may be arranged to correlate to the position and number of fibers 210, 211 in the waveguide holding members 205, 206, so that seating of the positioning member 204 within the detents 216 provides alignment between selected fibers 210, 211 of the first and second waveguide holding members 205, 206. For example, the spacing between detents 216 may be equal to the pitch of the fibers 210, 211. In further embodiments in accordance with the present invention, additional grooves, positioning members, and registration elements may be provided to enhance the kinematic stability or to enhance the tendency for a positioning member to reside at a particular location.

Figure 12:
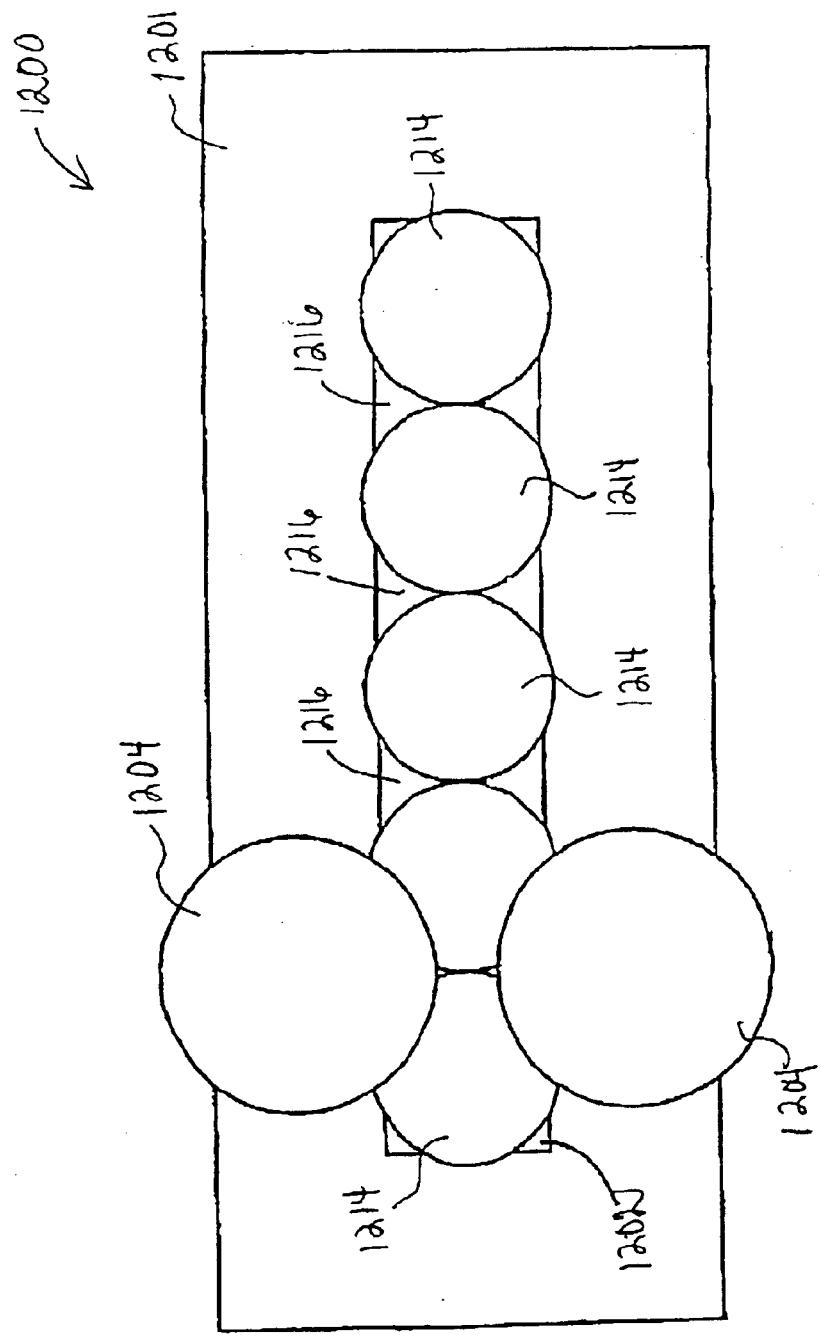
FIGS. 12 and 13 schematically illustrate a top view and a side elevational view, respectively, of an exemplary embodiment of a multiple-position passive alignment mechanism of the present invention which includes registration spheres that cooperate with two positioning spheres to facilitate passive alignment of optical fibers at multiple switch positions.
Figure 13:
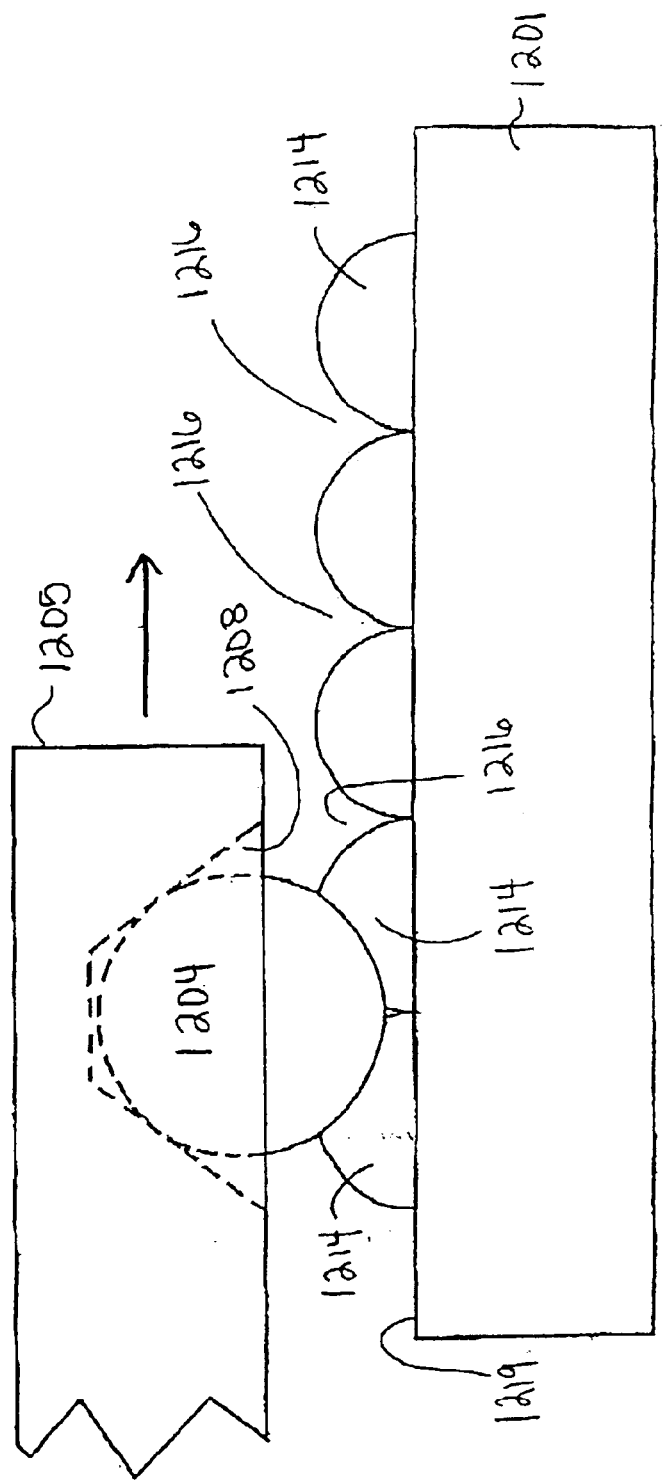

For example, referring to FIGS. 12 and 13, an alternative configuration of an alignment mechanism 1200 having two positioning members 204 is illustrated. FIGS. 12 and 13 illustrate a portion of a substrate 1201 containing a transverse groove 1202, which may be the transverse groove 202 of switch 200, for example. The registration elements 1214 are provided adjacent one another within the transverse groove 1202 to provide detents 1216 between adjacent pairs of registration elements 1214. The registration elements 1214 are dimensioned relative to the transverse groove 1202 so that the registration elements 1214 protrude above the upper surface 1219 of the substrate 1201. The detents 1216 provide regions along the transverse groove 1202 in which positioning members 1204 can preferentially seat. Each positioning member 1204 may be simultaneously retained within a pit 1208 of a first waveguide holding member 1205, so that the first waveguide holding member 1205 tracks the motion of the retained positioning member 1204. The configuration of FIGS. 12 and 13 provides two point contact between each positioning member 1204 and the corresponding registration elements 1214 against which each positioning member 1204 is seated. Thus, a total of four points of contact are provided which may produce enhanced kinematic stability of the alignment mechanism 1200.

Figure 14:
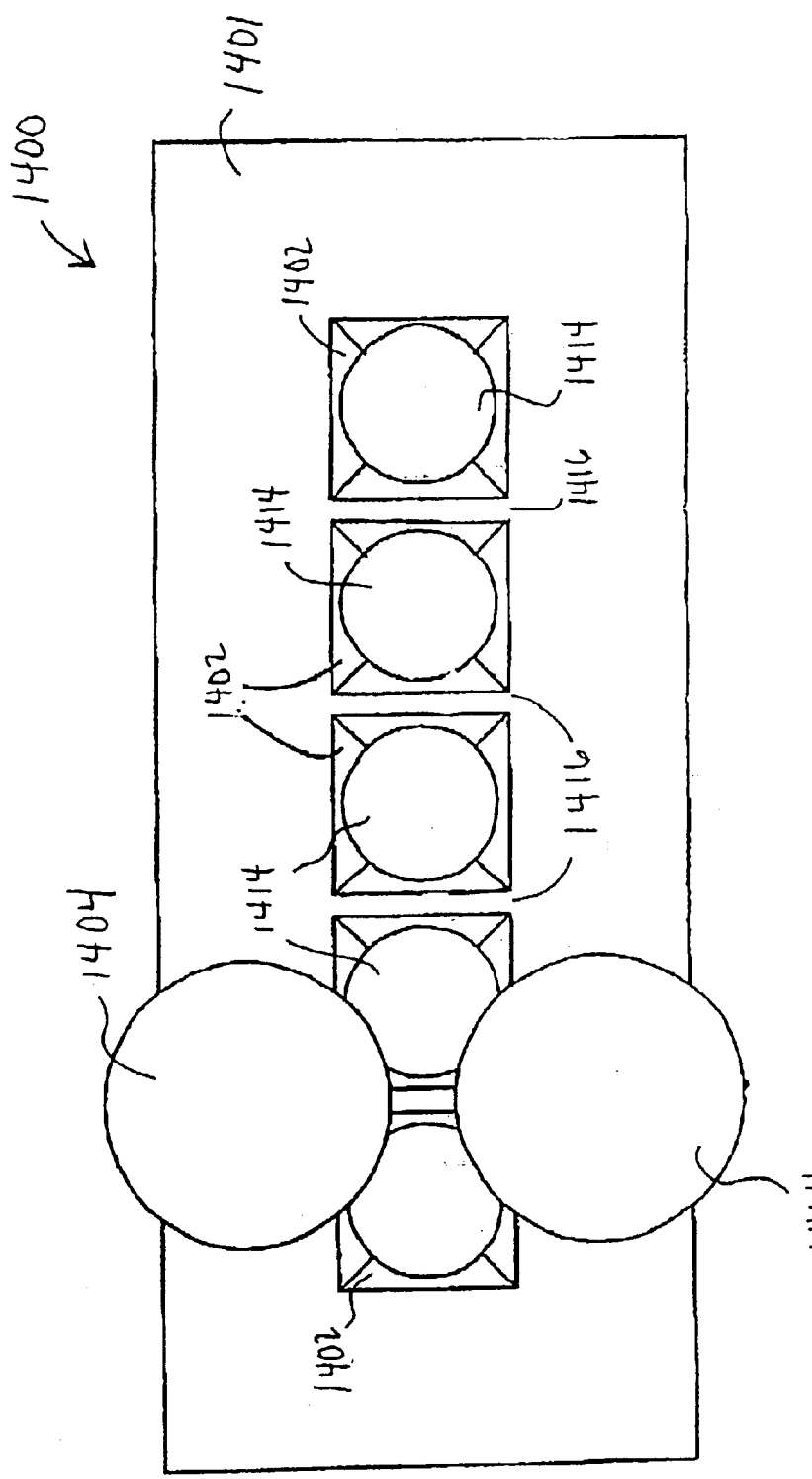
FIGS. 14 and 15 schematically illustrate a top view and a side elevational view, respectively, of an exemplary embodiment of a multiple-position passive alignment mechanism of the present invention that includes pits for retaining registration spheres that cooperate with two positioning spheres to facilitate passive alignment of optical fibers at multiple switch positions.
Figure 15:
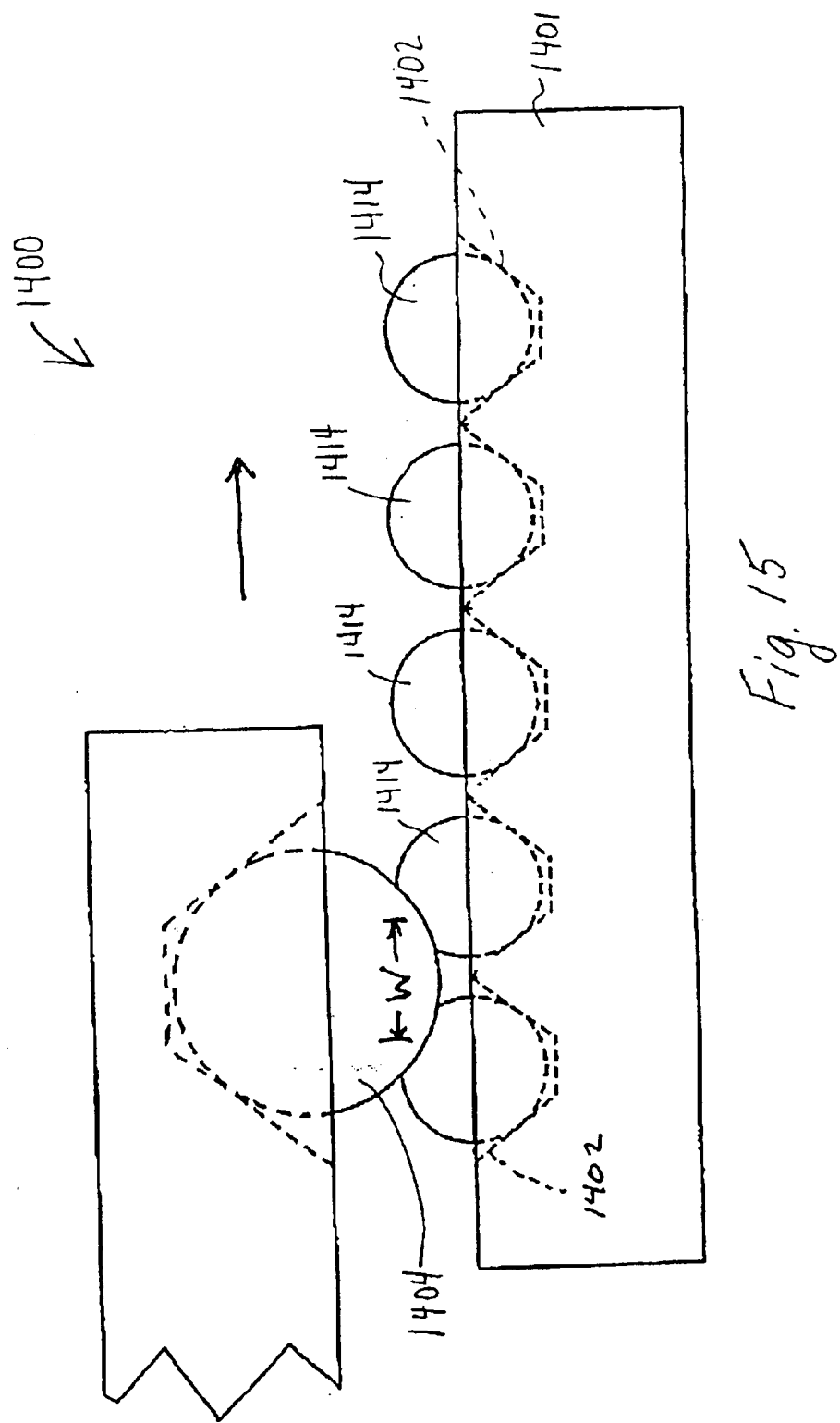

Alternatively, a similar configuration of an alignment mechanism 1400 may be provided, as illustrated in FIGS. 14 and 15, but with the registration elements 1414 disposed in individual pits 1402 rather than in a groove. The pits 1402 may be disposed in a row along the transverse direction. The pits 1402 may be provided in spaced apart relation so that the registration elements 1414 are not in contact, to provide detents 1416 having greater width along the transverse direction due to the spaced apart relation of the pits 1402. The increased width of the detents 1416 provides a greater distance, W, between the two points of contact between a positioning member 1404 and adjacent registration elements 1414. The increased distance, W, may enhance the stability with which the positioning member 1404 is seated within a detent 1416.

Figure 16:
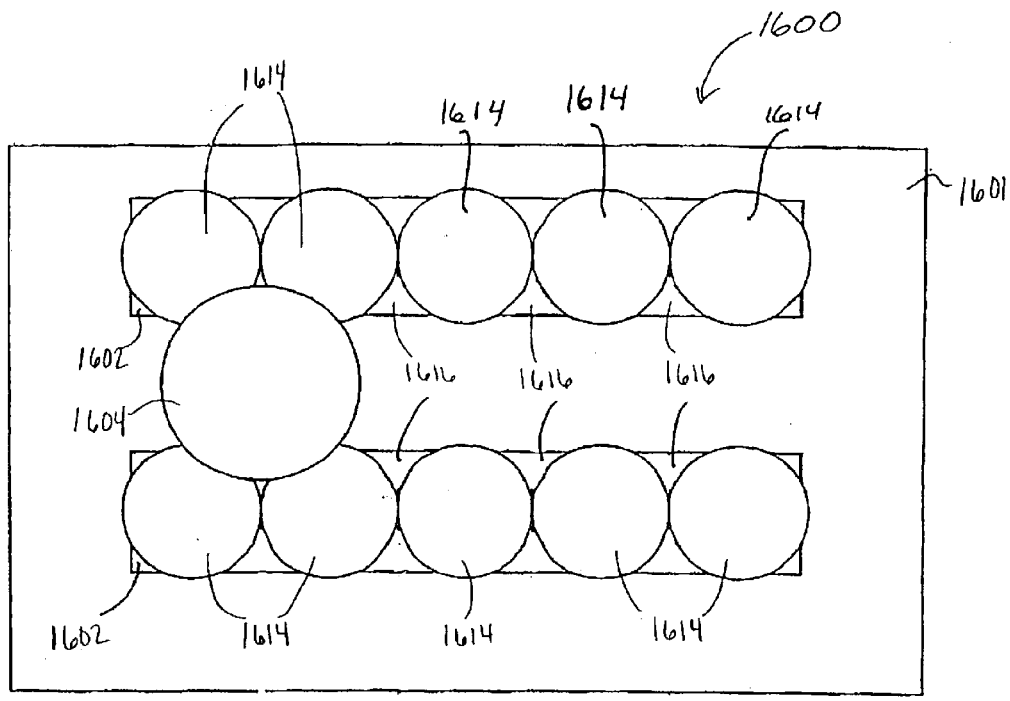
FIG. 16 schematically illustrates a top view of an exemplary embodiment of a multiple-position passive alignment mechanism of the present invention which includes registration spheres disposed in two rows that cooperate with a positioning sphere to facilitate passive alignment of optical fibers at multiple switch positions.
Figure 17:
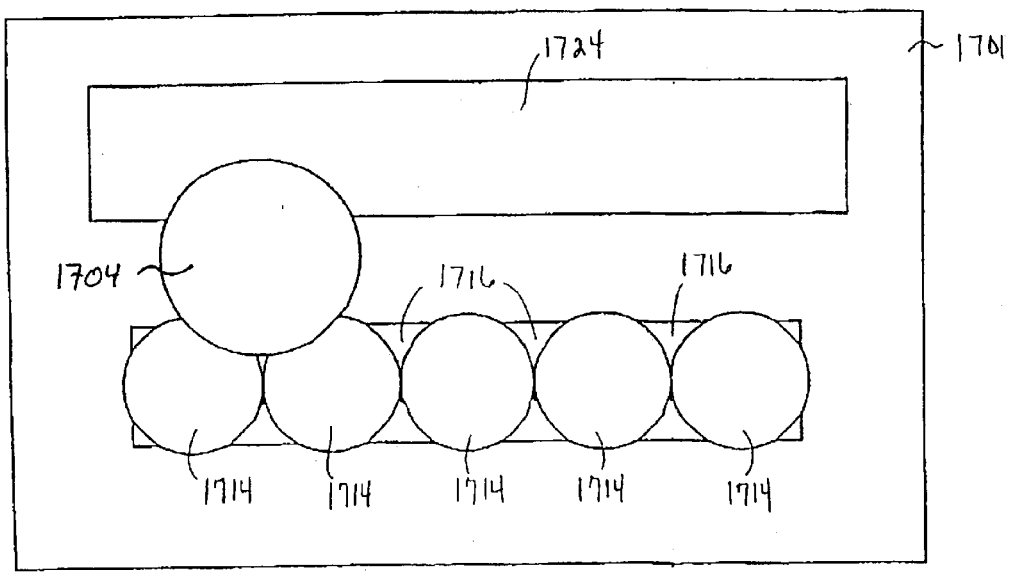
FIG. 17 schematically illustrates a top view of an exemplary embodiment of a multiple-position passive alignment mechanism of the present invention which includes a rod and a row of registration spheres that cooperate with a positioning sphere to facilitate passive alignment of optical fibers at multiple switch positions.

In yet an additional configuration of an alignment mechanism in accordance with the present invention, an alignment mechanism 1600 may include two rows of registration elements 1614 disposed within transverse grooves 1602, as illustrated in FIG. 16. The registration elements 1614 may be provided adjacent one another within the transverse grooves 1602 to provide detents 1616 between adjacent pairs of registration elements 1614. The registration elements 1614 are dimensioned relative to the transverse groove 1602 so that the registration elements 1614 protrude above the upper surface of the substrate 1601. The grooves 1602 are disposed in spaced apart parallel relation a sufficient amount so that a positioning member 1604 may be in simultaneous contact with four registration elements 1614. Thus, four contact points are provided between the positioning member 1604 and the adjacent registration elements 1614. Similarly, in an alternative configuration, as illustrated in FIG. 17, one of the rows of registration elements may be replaced with a rod 1724. The rod 1724 may be disposed within a groove of the substrate 1701. In such a configuration a positioning member 1704 seated within a detent 1716 makes three point contact. One point of contact is made with the rod 1724, and one point of contact is made with each of the two registration elements 1714 that positioning member 1704 contacts, for a total of three points of contact.

Figure 18:
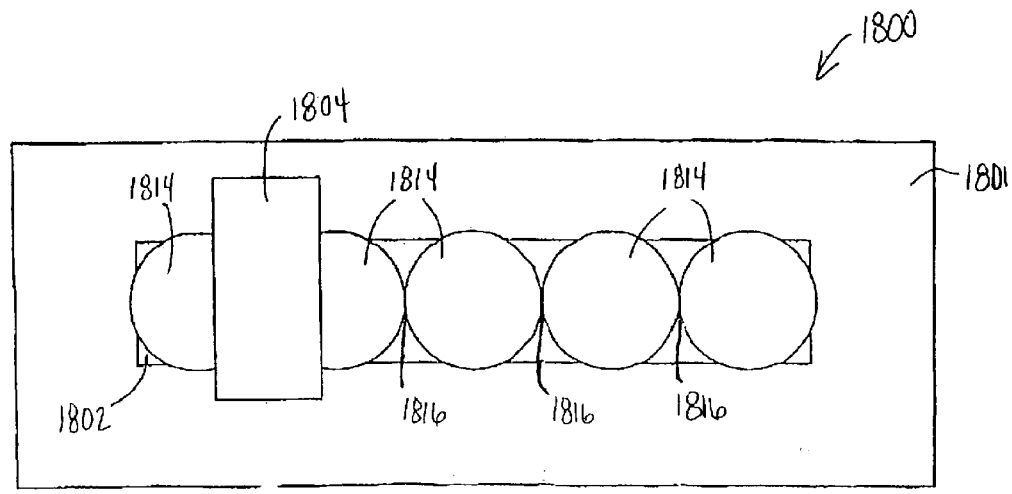
FIG. 18 schematically illustrates a top view of a multiple-position passive alignment mechanism of an exemplary embodiment of the present invention which includes a row of registration spheres that cooperate with a positioning rod to facilitate passive alignment of optical fibers at multiple switch positions.

In still further configurations of an alignment mechanism in accordance with the present invention, a rod-shaped positioning member, rather than spherical, may be provided. For example, referring to FIGS. 18 and 19, alternative configurations of alignment mechanisms 1800, 1900 are illustrated. FIG. 18 illustrates a portion of a substrate 1801 containing a transverse groove 1802, which maybe the transverse groove 202 of switch 200, for example. Registration elements 1814 are provided adjacent one another within the transverse groove 1802 to provide detents 1816 between adjacent pairs of registration elements 1814. The registration elements 1814 may be dimensioned relative to the transverse groove 1802 so that the registration elements 1814 protrude above the upper surface of the substrate 1801. The detents 1816 provide regions along the transverse groove 1802 in which a rod-shaped positioning member 1804 can preferentially seat. The configuration of FIG. 18 provides two point contact between the positioning member 1804 and the registration elements 1814 against which the positioning member 1804 is seated.

Figure 19:
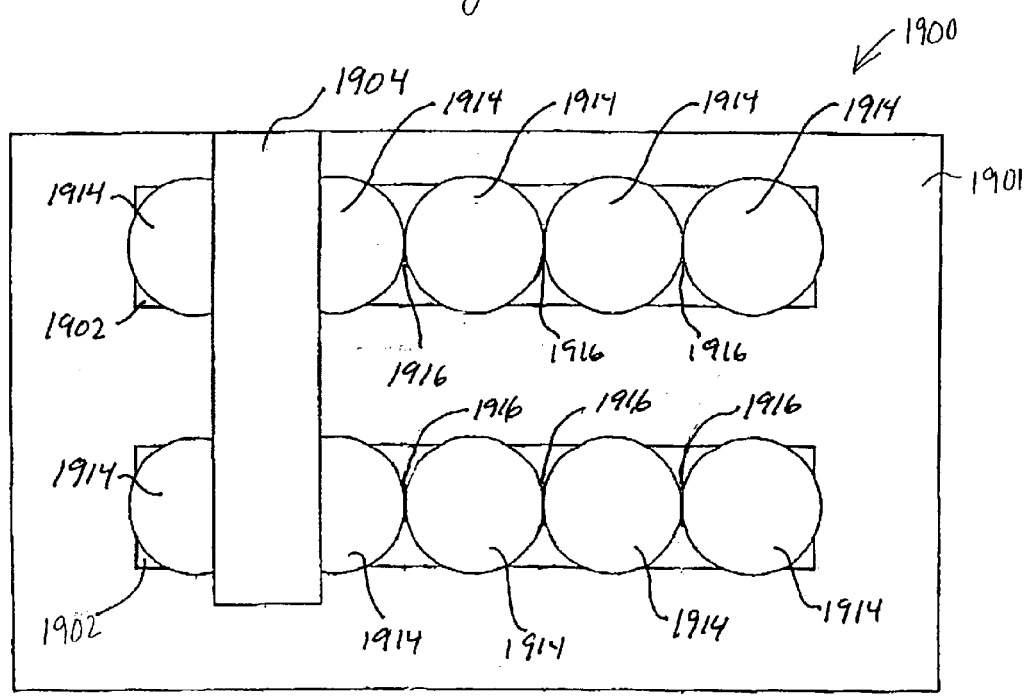
FIG. 19 schematically illustrates a top view of a multiple-position passive alignment mechanism of an exemplary embodiment of the present invention which includes registration spheres disposed in two rows that cooperate with a positioning rod to facilitate passive alignment of optical fibers at multiple switch positions.

Similarly, FIG. 19 illustrates an alignment mechanism 1900 which comprises a rod-shaped positioning element 1904. The registration mechanism 1900 includes two rows of registration elements 1914 disposed within the transverse grooves 1902. The transverse grooves 1902 may be the transverse grooves 202 of switch 200, for example. The registration elements 1914 may be provided adjacent one another within the transverse grooves 1902 to provide detents 1916 between adjacent pairs of registration elements 1914. The registration elements 1914 are dimensioned relative to the transverse groove 1902 so that the registration elements 1914 protrude above the upper surface of the substrate 1901. The grooves 1902 may be disposed in spaced apart parallel relation so that the rod-shaped positioning member 1904 may be in simultaneous contact with four registration elements 1914. Thus, four contact points are provided between the rod-shaped positioning member 1904 and the registration elements 1914 that the positioning member 1904 contacts.

Figure 20:
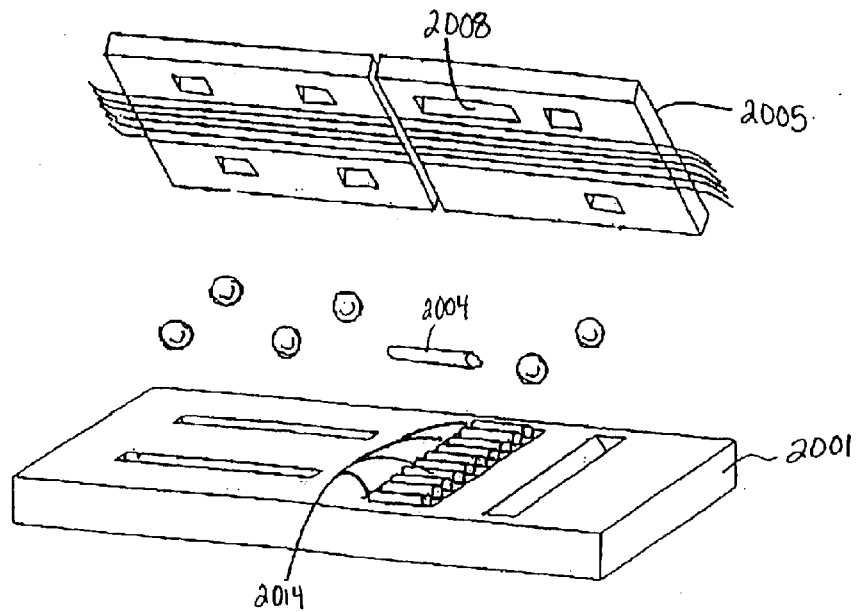
FIG. 20 schematically illustrates an exploded view of an exemplary embodiment of a switch of the present invention which includes registration rods that cooperate with a positioning rod to facilitate passive alignment of optical fibers at multiple switch positions.
Figure 21:
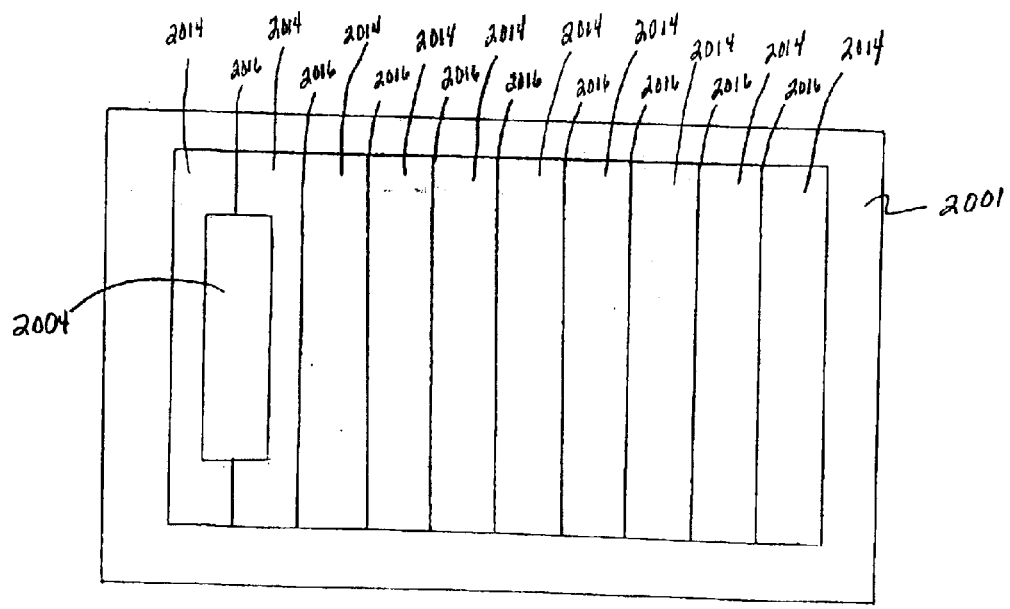
FIG. 21 schematically illustrates a top view of the registration rods of FIG. 20.
Figure 22:
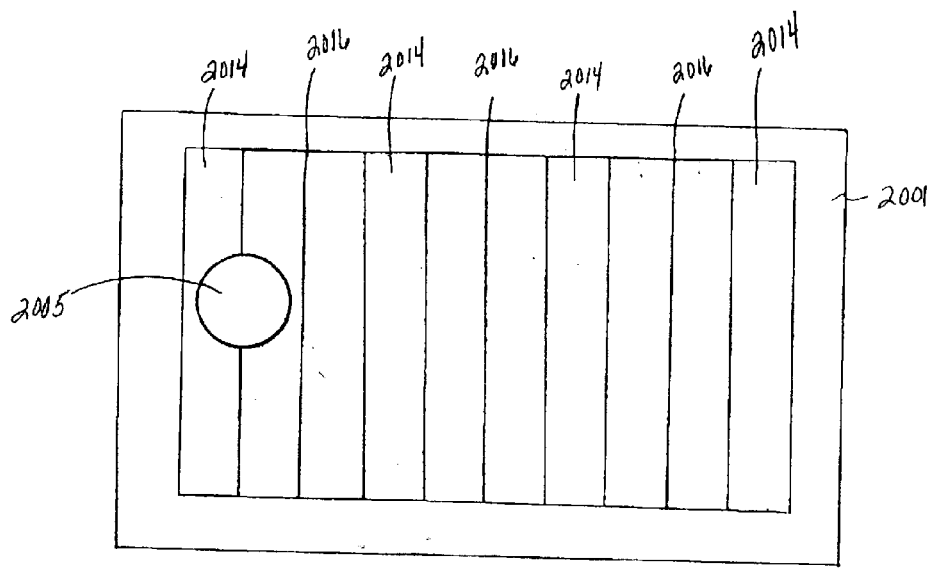
FIG. 22 schematically illustrates a top view of an exemplary embodiment of a multiple-position passive alignment mechanism of the present invention which includes a row of registration rods that cooperate with a positioning sphere to facilitate passive alignment of optical fibers at multiple switch positions.

In yet additional configurations of an alignment mechanism in accordance with the present invention, a rod-shaped registration element, rather than spherical, may be provided. For example, referring to FIGS. 20–22, alterative configurations of alignment mechanisms are illustrated. Rod-shaped registration elements 2014 are provided adjacent one another in a row to provide detents 2016 between adjacent pairs of registration elements 2014. The row of rod-shaped registration elements 2014 may be provided along the transverse direction and may be disposed in a single groove or a series of grooves. The registration elements 2014 may be dimensioned so that the registration elements 2014 protrude above the upper surface of the substrate 2001. The detents 2016 provide regions along the transverse groove 2002 in which a rod-shaped positioning member 2004, as shown in FIGS. 20 and 21, or a spherical positioning member 2005, as shown in FIG. 22, can preferentially seat. The configuration of FIG. 22 provides two point contact between the spherical positioning member 2005 and the registration elements 2014 against which the positioning member 2004 is seated. The configuration of FIGS. 20 and 21 provides two line-contacts between the rod-shaped positioning member 2004 and the registration elements 2014 against which the rod-shaped positioning member 2004 is seated.

Figure 23:
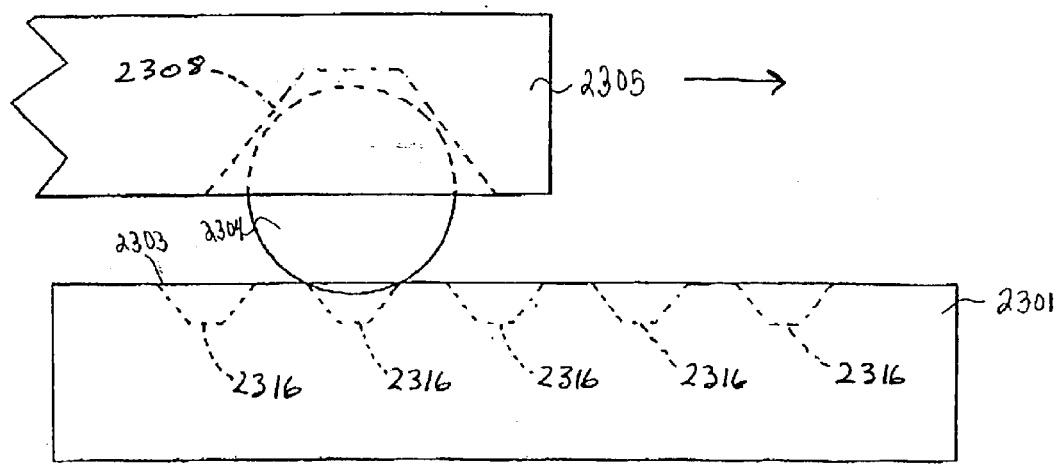
FIG. 23 schematically illustrates a side elevational view of an exemplary embodiment of a multiple-position passive alignment mechanism of the present invention which includes detents that cooperate with a positioning sphere to facilitate passive alignment of optical fibers at multiple switch positions.
Figure 24:
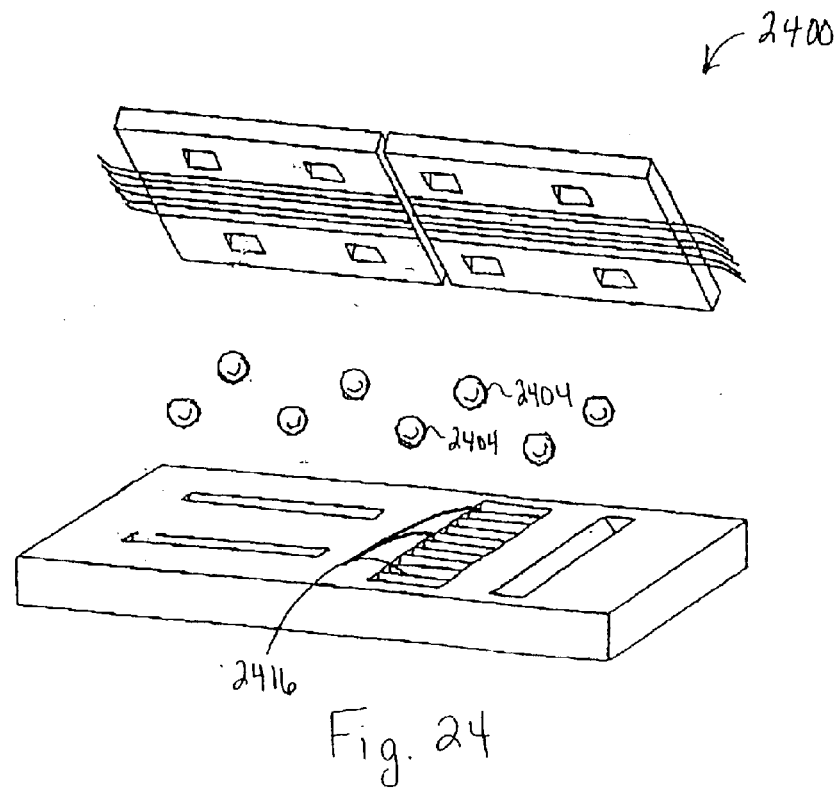
FIG. 24 schematically illustrates an exploded view of an exemplary embodiment of a switch of the present invention which includes detents that cooperate with positioning spheres to facilitate passive alignment of optical fibers at multiple switch positions.
Figure 25:
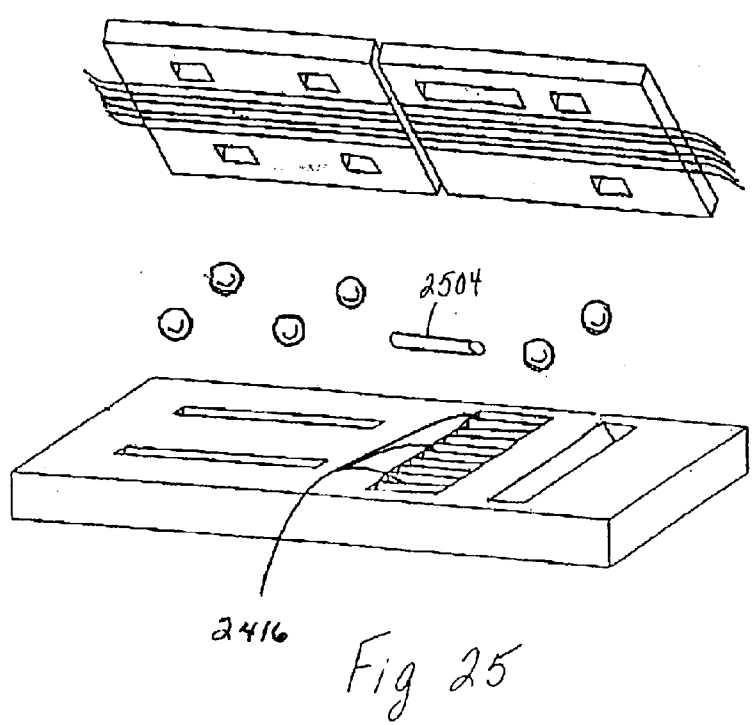
FIG. 25 schematically illustrates an exploded view of an exemplary embodiment of a switch of the present invention which includes detents that cooperate with a positioning rod to facilitate passive alignment of optical fibers at multiple switch positions.

As an alternative to the above configurations of alignment mechanisms, the registration elements may be provided as depressions in the substrate. For example, referring to FIG. 23, a side elevational view is shown of a switch 2300 having registration elements 2316 in the form of depressions. The depressions may take the form of pits or grooves and may be created by isotropic wet etching, anisotropic etching, or a combination of etching techniques, for example. The registration elements 2316 are disposed in a row along the transverse direction to provide depressions in which a positioning member 2304, such as a positioning sphere, can preferentially seat. Alternatively, the positioning member 2304 may be a rod. The comers 2303 of the registration elements 2316 may be smoothed or rounded to facilitate movement of the positioning member 2304 into and out of the registration elements 2316. The positioning member 2304 may be retained within a pit 2308 of the first waveguide holding member 2305, so that the first waveguide holding member 2305 tracks the motion of the retained positioning member 2304. The location and number of registration elements 2316 may be arranged to correlate to the position and number of fibers in the waveguide holding members, so that seating of the positioning member 2304 within the detents 2316 provides alignment between fibers of the first and second waveguide holding members. The registration elements 2316 may be spaced apart from one another as illustrated in FIG. 23. Alternatively, registration elements 2416 may be depressions that are disposed next to one another as illustrated in FIG. 24. The registration elements 2416 may comprise a row of grooves in which a spherical positioning member 2404 or a rod-shaped positioning member 2504 is disposed, as illustrated in FIGS. 24 and 25, respectively.

Figure 26:
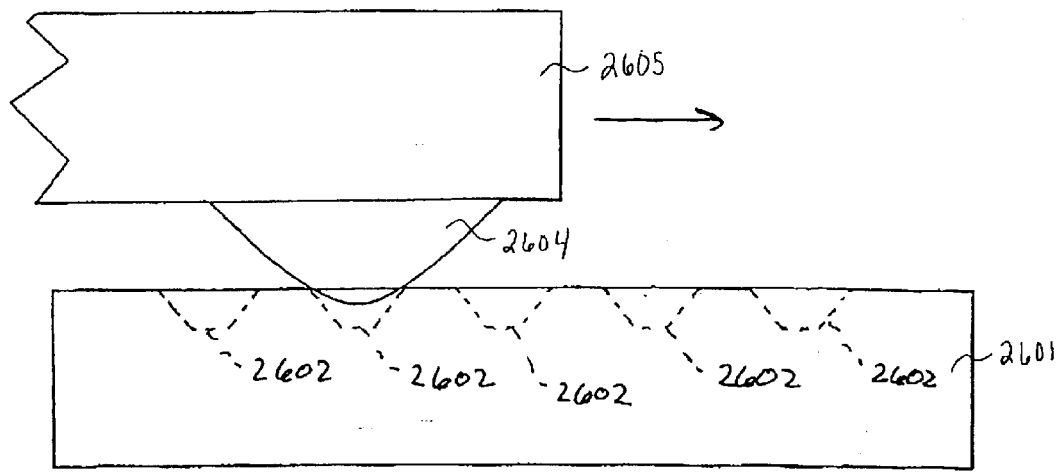
FIG. 26 schematically illustrates a side elevational view of an exemplary embodiment of a multiple-position passive alignment mechanism of the present invention which includes detents that cooperate with a positioning protrusion to facilitate passive alignment of optical fibers at multiple switch positions.
Figure 27:
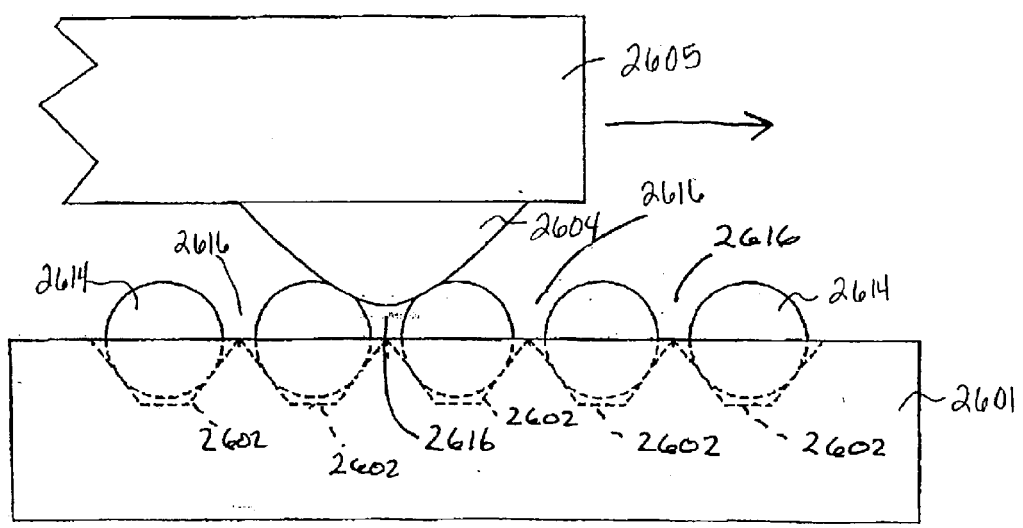
FIG. 27 schematically illustrates a side elevational view of an exemplary embodiment of a multiple-position passive alignment mechanism of a switch of the present invention which includes a row of registration spheres that cooperate with a positioning protrusion to facilitate passive alignment of optical fibers at multiple switch positions.

In certain uses, it may be desirable to provide a positioning member as an integral portion of a waveguide holding member, a substrate, or both. For example, referring to FIGS. 26 and 27, side elevational views of a portion of a switch having an integral positioning member 2604 are illustrated. The positioning member 2604 may be a separate element attached to a waveguide holding member 2605 to provide a protrusion. Alternatively, the positioning member 2604 may be a protrusion that is monolithic with the waveguide holding member 2605. The substrate 2601 may comprise registration elements provided in the form of a row of depressions 2602, which may include pits, grooves, or combinations of pits and grooves. The depressions 2602 and positioning member 2604 are dimensioned so that the positioning member 2604 may seat within the depressions 2602. Alternatively, microspheres 2614 may be provided within the depressions 2602 to provide detents 2616 in which the positioning member 2604 may seat.

Figure 29:
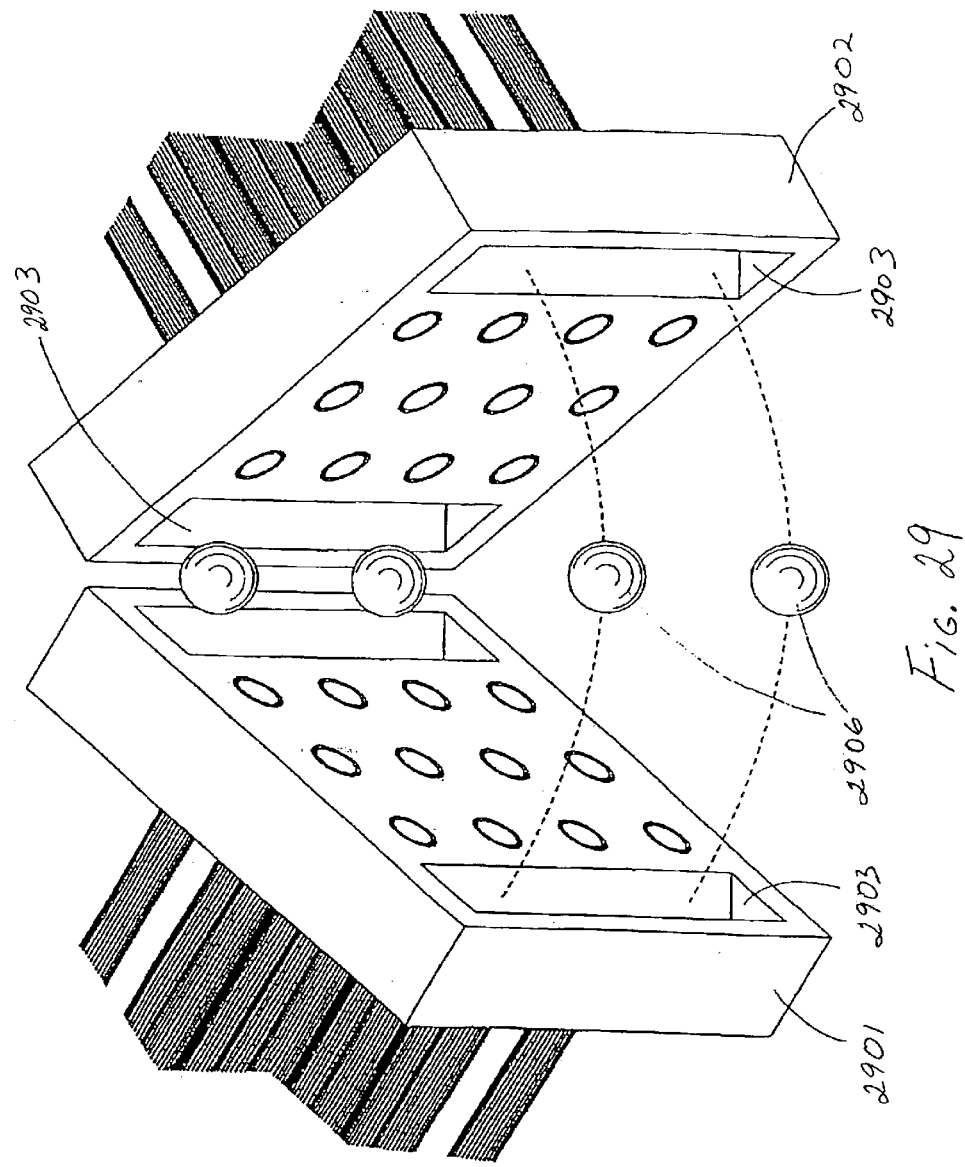
FIG. 29 schematically illustrates an exploded view of a fiber array switch for use with a multiple-position passive alignment mechanism of the present invention.

The multiple-position, passive alignment mechanisms of the present invention, such as those described above, may also be used to provide preferred switching locations in other switch configurations such as a fiber array switch as illustrated in FIG. 29. The fiber array switch 2900 includes first and second arrays 2901, 2902 and grooves 2903, with positioning members 2906 sandwiched therebetween. The grooves 2903 may be provided with registration elements, such as those described above, to permit one array 2901 to be translationally moved relative to the other array 2902 into preferred switching locations defined by the registration elements. The positioning members 2906 may be provided as spheres, as illustrated in FIG. 29, or may be provided in other forms as disclosed herein.

The positioning members described above may comprise materials which include ceramics, such as silicon nitride, zirconia, alumina, spinel, aluminum nitride, and other ceramics. In addition, the positioning members may be made of glass or metals, such as steel or titanium. The rod-shaped components may be, for example, segments of optical fibers. Further, the positioning members and/or registration elements may be coated with a wear-resistant material such as a suitable carbide or nitride material.

From the foregoing description, particularly of the illustrative embodiments shown in FIGS. 2–28, the following generalities may be realized. The grooves and pits may be collectively referred to as depressions. These depressions may be in the substrate and in the first and second waveguide holding members. A waveguide holding member usefully may have at least two depressions. The portion of the substrate opposed to the waveguide holding member (i.e. the portion of the substrate over which the waveguide holding member is disposed) may usefully include at least two depressions. Moreover, at least three of the depressions may desirably be grooves. Finally, no two opposing depressions are pits. A similar analysis applies to the waveguide holding member disposed on the other portions of the substrate.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An optical switch, comprising:
   a substrate having an upper surface;
   a first waveguide holding member disposed over the upper substrate surface;
   a second waveguide holding member disposed over the upper substrate surface and slidably movable relative to the first waveguide holding member to provide a switching function; and
   a movement guiding member disposed between the upper substrate surface and the second waveguide holding member for guiding the movement of the second waveguide holding member, the movement guiding member comprising at least one detent for positioning the second waveguide holding member at a selected location relative to the first waveguide holding member to selectively couple a waveguide of the second waveguide holding member to a waveguide of the first waveguide holding member.

2. An optical switch as recited in claim 1, wherein the detent is dimensioned to receive a portion of the movement guiding member.

3. An optical switch as recited in claim 1, wherein the movement guiding member comprises a plurality of registration elements between which the detent is located.

4. An optical switch as recited in claim 3, wherein the at least one registration element comprises a plurality of adjacent spheres or rods.

5. An optical switch as recited in claim 3, wherein the movement guiding member comprises a transverse groove in which the at least one registration element is disposed.

6. An optical switch as recited in claim 1, wherein the movement guiding member comprises a transverse groove in which the detent is disposed.

7. An optical switch as recited in claim 1, wherein the movement guiding member comprises a positioning member for engagement with the detent.

8. An optical switch as recited in claim 7, wherein the positioning member is a monolithic part of the second waveguide holding member.

9. An optical switch as recited in claim 7, wherein the positioning member comprises a sphere disposed within a pit of the second waveguide holding member.

10. An optical switch as recited in claim 7, wherein the detent is positioned so that movement of the positioning member into registry with the detent selectively couples a waveguide of the second waveguide holding member to a waveguide of the first waveguide holding member.

11. An optical switch as recited in claim 1, wherein the second waveguide holding member comprises a plurality of fibers disposed in spaced apart relation at a pitch, and the at least one detent comprises a plurality of detents spaced apart from one another at the same pitch as the fibers.

12. An optical switch as recited in claim 1, wherein the movement guiding member guides the movement of the second waveguide holding member along a direction perpendicular to the optical axis of a fiber retained by the second waveguide holding member.

13. An optical switch as recited in claim 1, wherein the movement guiding member guides the movement of the second waveguide holding member parallel to the upper substrate surface.

* * * * *